(12) United States Patent
Brown et al.

(10) Patent No.: US 9,747,242 B2
(45) Date of Patent: Aug. 29, 2017

(54) METHODS AND APPARATUSES FOR PROVIDING DATA RECEIVED BY A PLURALITY OF STATE MACHINE ENGINES

(71) Applicant: Micron Technology, Inc., Boise, ID (US)

(72) Inventors: David R. Brown, Lucas, TX (US); Harold B Noyes, Boise, ID (US); Inderjit S. Bains, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/257,677

(22) Filed: Sep. 6, 2016

(65) Prior Publication Data

US 2016/0371215 A1    Dec. 22, 2016

Related U.S. Application Data

(62) Division of application No. 14/065,168, filed on Oct. 28, 2013, now Pat. No. 9,448,965.

(60) Provisional application No. 61/788,364, filed on Mar. 15, 2013.

(51) Int. Cl.
*G06F 17/00* (2006.01)
*G06F 13/40* (2006.01)
*G06F 15/78* (2006.01)
*G06F 9/44* (2006.01)
*G06N 3/08* (2006.01)

(52) U.S. Cl.
CPC ......... *G06F 13/4027* (2013.01); *G06F 9/444* (2013.01); *G06F 15/7867* (2013.01); *G06N 3/08* (2013.01)

(58) Field of Classification Search
CPC ....................................................... G06F 9/444
USPC .................................................... 706/12, 45
See application file for complete search history.

(56) References Cited

U.S. PATENT DOCUMENTS

| | | |
|---|---|---|
| 3,849,762 A | 11/1974 | Fujimoto et al. |
| 3,921,136 A | 11/1975 | Bar-Lev |
| 4,011,547 A | 3/1977 | Kimmel |

(Continued)

FOREIGN PATENT DOCUMENTS

| | | |
|---|---|---|
| CN | 1656471 A | 8/2005 |
| EP | 0476159 A1 | 3/1992 |

(Continued)

OTHER PUBLICATIONS

European Search Report dated Nov. 2, 2016, EP application No. 14767978.1.

(Continued)

*Primary Examiner* — David Vincent
(74) *Attorney, Agent, or Firm* — Fletcher Yoder, P.C.

(57) ABSTRACT

An apparatus can include a first state machine engine configured to receive a first portion of a data stream from a processor and a second state machine engine configured to receive a second portion of the data stream from the processor. The apparatus includes a buffer interface configured to enable data transfer between the first and second state machine engines. The buffer interface includes an interface data bus coupled to the first and second state machine engines. The buffer interface is configured to provide data between the first and second state machine engines.

40 Claims, 17 Drawing Sheets

(56) References Cited

U.S. PATENT DOCUMENTS

| | | | |
|---|---|---|---|
| 4,014,000 | A | 3/1977 | Uno et al. |
| 4,123,695 | A | 10/1978 | Hale et al. |
| 4,153,897 | A | 5/1979 | Yasuda et al. |
| 4,204,193 | A | 5/1980 | Schroeder |
| 4,414,685 | A | 11/1983 | Sternberg |
| 4,748,674 | A | 5/1988 | Freeman |
| 5,014,327 | A | 5/1991 | Potter et al. |
| 5,028,821 | A | 7/1991 | Kaplinsky |
| 5,216,748 | A | 6/1993 | Quenot et al. |
| 5,257,361 | A | 10/1993 | Doi et al. |
| 5,287,523 | A | 2/1994 | Allison et al. |
| 5,291,482 | A | 3/1994 | McHarg et al. |
| 5,300,830 | A | 4/1994 | Hawes |
| 5,331,227 | A | 7/1994 | Hawes |
| 5,357,512 | A | 10/1994 | Khaira et al. |
| 5,371,878 | A | 12/1994 | Coker |
| 5,377,129 | A | 12/1994 | Molvig et al. |
| 5,459,798 | A | 10/1995 | Bailey et al. |
| 5,586,266 | A | 12/1996 | Hershey et al. |
| 5,615,237 | A | 3/1997 | Chang et al. |
| 5,659,551 | A | 8/1997 | Huott et al. |
| 5,723,984 | A | 3/1998 | Sharpe-Geisler |
| 5,754,878 | A | 5/1998 | Asghar et al. |
| 5,790,531 | A | 8/1998 | Ellebracht et al. |
| 5,881,312 | A | 3/1999 | Dulong |
| 5,896,548 | A | 4/1999 | Ofek |
| 5,956,741 | A | 9/1999 | Jones |
| 6,011,407 | A | 1/2000 | New |
| 6,016,361 | A | 1/2000 | Hongu et al. |
| 6,034,963 | A | 3/2000 | Minami et al. |
| 6,041,405 | A | 3/2000 | Green |
| 6,052,766 | A | 4/2000 | Betker et al. |
| 6,058,469 | A | 5/2000 | Baxter |
| 6,151,644 | A | 11/2000 | Wu |
| 6,240,003 | B1 | 5/2001 | McElroy |
| 6,279,128 | B1 | 8/2001 | Arnold et al. |
| 6,317,427 | B1 | 11/2001 | Augusta et al. |
| 6,362,868 | B1 | 3/2002 | Silverbrook |
| 6,400,996 | B1 | 6/2002 | Hoffberg et al. |
| 6,606,699 | B2 | 8/2003 | Pechanek et al. |
| 6,614,703 | B2 | 9/2003 | Pitts et al. |
| 6,625,740 | B1 | 9/2003 | Datar et al. |
| 6,633,443 | B1 | 10/2003 | Watanabe et al. |
| 6,636,483 | B1 | 10/2003 | Pannell |
| 6,640,262 | B1 | 10/2003 | Uppunda et al. |
| 6,697,979 | B1 | 2/2004 | Vorbach et al. |
| 6,700,404 | B1 | 3/2004 | Feng et al. |
| 6,880,087 | B1 | 4/2005 | Carter |
| 6,906,938 | B2 | 6/2005 | Kaginele |
| 6,944,710 | B2 | 9/2005 | Regev et al. |
| 6,977,897 | B1 | 12/2005 | Nelson et al. |
| 7,010,639 | B2 | 3/2006 | Larson et al. |
| 7,089,352 | B2 | 8/2006 | Regev et al. |
| 7,146,643 | B2 | 12/2006 | Dapp et al. |
| 7,176,717 | B2 | 2/2007 | Sunkavalli et al. |
| 7,276,934 | B1 | 10/2007 | Young |
| 7,305,047 | B1 | 12/2007 | Turner |
| 7,358,761 | B1 | 4/2008 | Sunkavalli et al. |
| 7,366,352 | B2 | 4/2008 | Kravec et al. |
| 7,392,229 | B2 | 6/2008 | Harris et al. |
| 7,428,722 | B2 | 9/2008 | Sunkavalli et al. |
| 7,487,131 | B2 | 2/2009 | Harris et al. |
| 7,487,542 | B2 | 2/2009 | Boulanger et al. |
| 7,499,464 | B2 | 3/2009 | Ayrapetian et al. |
| 7,725,510 | B2 | 5/2010 | Alicherry et al. |
| 7,774,286 | B1 | 8/2010 | Harris |
| 7,804,719 | B1 | 9/2010 | Chirania et al. |
| 7,890,923 | B2 | 2/2011 | Elaasar |
| 7,899,052 | B1 | 3/2011 | Hao et al. |
| 7,917,684 | B2 | 3/2011 | Noyes et al. |
| 7,970,964 | B2 | 6/2011 | Noyes |
| 8,015,530 | B1 | 9/2011 | Sinclair et al. |
| 8,020,131 | B1 | 9/2011 | Van Mau et al. |
| 8,065,249 | B1 | 11/2011 | Harris et al. |
| 8,140,780 | B2 | 3/2012 | Noyes |
| 8,146,040 | B1 | 3/2012 | Janneck et al. |
| 8,159,900 | B2 | 4/2012 | Moore et al. |
| 8,209,521 | B2 | 6/2012 | Noyes et al. |
| 8,239,660 | B2 | 8/2012 | Cervini |
| 8,281,395 | B2 | 10/2012 | Pawlowski |
| 8,294,490 | B1 | 10/2012 | Kaviani |
| 8,402,188 | B2 | 3/2013 | Noyes et al. |
| 8,536,896 | B1 | 9/2013 | Trimberger |
| 8,593,175 | B2 | 11/2013 | Noyes et al. |
| 8,680,888 | B2 | 3/2014 | Brown |
| 8,726,256 | B2 * | 5/2014 | Xu .......................... G06F 8/45 |
| | | | 717/133 |
| 8,782,624 | B2 | 7/2014 | Brown |
| 2002/0186044 | A1 | 12/2002 | Agrawal et al. |
| 2003/0107996 | A1 | 6/2003 | Black et al. |
| 2003/0142698 | A1 | 7/2003 | Parhi |
| 2003/0163615 | A1 | 8/2003 | Yu |
| 2003/0226002 | A1 | 12/2003 | Boutaud et al. |
| 2004/0100980 | A1 | 5/2004 | Jacobs et al. |
| 2004/0103265 | A1 | 5/2004 | Smith |
| 2004/0125807 | A1 | 7/2004 | Liu et al. |
| 2004/0151211 | A1 | 8/2004 | Snider |
| 2004/0184662 | A1 | 9/2004 | Kravec et al. |
| 2004/0202028 | A1 * | 10/2004 | Cioaca ................. G11C 16/26 |
| | | | 365/189.11 |
| 2005/0154916 | A1 | 7/2005 | Boulanger et al. |
| 2005/0251638 | A1 | 11/2005 | Boutaud et al. |
| 2006/0158219 | A1 | 7/2006 | Sunkavalli et al. |
| 2006/0195496 | A1 | 8/2006 | Vadi et al. |
| 2006/0206875 | A1 | 9/2006 | Ullmann et al. |
| 2006/0257043 | A1 | 11/2006 | Chiu |
| 2006/0274001 | A1 | 12/2006 | Guttag et al. |
| 2006/0288070 | A1 | 12/2006 | Vadi et al. |
| 2007/0005869 | A1 | 1/2007 | Balraj et al. |
| 2007/0075878 | A1 | 4/2007 | Furodet et al. |
| 2007/0127482 | A1 | 6/2007 | Harris et al. |
| 2007/0150623 | A1 | 6/2007 | Kravec et al. |
| 2007/0159653 | A1 | 7/2007 | Dholakia et al. |
| 2007/0282833 | A1 | 12/2007 | McMillen |
| 2007/0283108 | A1 | 12/2007 | Isherwood et al. |
| 2007/0297268 | A1 | 12/2007 | Freebern |
| 2008/0126690 | A1 | 5/2008 | Rajan et al. |
| 2008/0129334 | A1 | 6/2008 | Sunkavalli et al. |
| 2008/0133874 | A1 | 6/2008 | Capek et al. |
| 2008/0136690 | A1 | 6/2008 | Morzano et al. |
| 2008/0140661 | A1 | 6/2008 | Pandya |
| 2008/0140911 | A1 | 6/2008 | Pandya |
| 2008/0178031 | A1 | 7/2008 | Kim |
| 2008/0195783 | A1 | 8/2008 | Deshpande |
| 2008/0256347 | A1 | 10/2008 | Eickemeyer et al. |
| 2008/0320053 | A1 | 12/2008 | Iijima et al. |
| 2009/0198952 | A1 | 8/2009 | Khmelnitsky et al. |
| 2009/0204734 | A1 | 8/2009 | Strait et al. |
| 2010/0100691 | A1 | 4/2010 | Noyes |
| 2010/0100714 | A1 | 4/2010 | Noyes |
| 2010/0115158 | A1 | 5/2010 | Noyes |
| 2010/0115173 | A1 * | 5/2010 | Noyes ................ G06K 9/00986 |
| | | | 710/315 |
| 2010/0115347 | A1 | 5/2010 | Noyes |
| 2010/0118425 | A1 | 5/2010 | Rafaelof |
| 2010/0122024 | A1 | 5/2010 | Noyes |
| 2010/0138432 | A1 | 6/2010 | Noyes |
| 2010/0138575 | A1 | 6/2010 | Noyes |
| 2010/0138634 | A1 | 6/2010 | Noyes |
| 2010/0138635 | A1 | 6/2010 | Noyes |
| 2010/0145182 | A1 | 6/2010 | Schmidt et al. |
| 2010/0174887 | A1 | 7/2010 | Pawlowski |
| 2010/0174929 | A1 | 7/2010 | Pawlowski |
| 2010/0175130 | A1 | 7/2010 | Pawlowski |
| 2010/0185647 | A1 | 7/2010 | Noyes |
| 2010/0205326 | A1 | 8/2010 | Deshpande et al. |
| 2010/0325352 | A1 | 12/2010 | Schuette et al. |
| 2010/0332809 | A1 | 12/2010 | Noyes et al. |
| 2011/0004578 | A1 | 1/2011 | Momma et al. |
| 2011/0145182 | A1 | 6/2011 | Dlugosch |
| 2011/0145271 | A1 | 6/2011 | Noyes et al. |
| 2011/0145544 | A1 | 6/2011 | Noyes et al. |
| 2011/0161620 | A1 | 6/2011 | Kaminski et al. |
| 2011/0208900 | A1 | 8/2011 | Schuette et al. |

(56) References Cited

U.S. PATENT DOCUMENTS

| | | | |
|---|---|---|---|
| 2011/0258360 A1 | 10/2011 | Noyes | |
| 2011/0307233 A1 | 12/2011 | Tseng et al. | |
| 2011/0307433 A1* | 12/2011 | Dlugosch | G06F 15/17362 706/45 |
| 2011/0307503 A1 | 12/2011 | Dlugosch | |
| 2011/0320759 A1 | 12/2011 | Craddock et al. | |
| 2012/0179854 A1 | 7/2012 | Noyes | |
| 2012/0192163 A1 | 7/2012 | Glendenning et al. | |
| 2012/0192164 A1 | 7/2012 | Xu et al. | |
| 2012/0192165 A1 | 7/2012 | Xu et al. | |
| 2012/0192166 A1 | 7/2012 | Xu et al. | |
| 2013/0154685 A1 | 6/2013 | Noyes | |
| 2013/0156043 A1 | 6/2013 | Brown | |
| 2013/0159239 A1* | 6/2013 | Brown | G06K 9/00986 706/48 |
| 2013/0159670 A1 | 6/2013 | Noyes | |
| 2013/0159671 A1* | 6/2013 | Brown | G06K 9/00986 712/36 |
| 2013/0275709 A1 | 10/2013 | Gajapathy | |
| 2014/0025614 A1 | 1/2014 | Noyes | |
| 2014/0025889 A1 | 1/2014 | Brown | |
| 2014/0025905 A1 | 1/2014 | Brown | |
| 2014/0025923 A1 | 1/2014 | Klein | |
| 2014/0067736 A1 | 3/2014 | Noyes | |
| 2014/0068167 A1 | 3/2014 | Brown | |
| 2014/0068234 A1 | 3/2014 | Brown | |
| 2014/0077838 A1 | 3/2014 | Noyes | |
| 2014/0115299 A1 | 4/2014 | Noyes | |

FOREIGN PATENT DOCUMENTS

| | | |
|---|---|---|
| EP | 0943995 | 9/1999 |
| JP | 08087462 | 4/1996 |
| JP | 10069459 | 3/1998 |
| JP | 10111862 A | 4/1998 |
| JP | 2000231549 A | 8/2000 |
| JP | 2000347708 A | 12/2000 |
| JP | 2007018105 A | 1/2007 |
| JP | 2011-191901 A | 9/2011 |
| KR | 1020080097573 A | 11/2008 |
| TW | 201027425 A | 7/2010 |
| TW | 201145023 A | 12/2011 |
| WO | 0065425A1 A1 | 11/2000 |
| WO | 0138978 | 5/2001 |
| WO | 03039001 A1 | 5/2003 |
| WO | 2005036750 A1 | 4/2005 |
| WO | 2011114120 A1 | 9/2011 |

OTHER PUBLICATIONS

U.S. Appl. No. 60/652,738, filed Feb. 12, 2005, Harris, Curtis Lee.
U.S. Appl. No. 61/788,364, filed Mar. 15, 2013, Brown, David R.
U.S. Appl. No. 14/065,168, filed Oct. 28, 2013, Brown, David R.
Apr. 26, 2010 ISRWO—PCT/US2009/067534.
Feb. 15, 2012 ISR—PCT/US2009/061649.
Feb. 4, 2013 Taiwan OA in Application No. 098144804.
Mar. 28, 2013 ISR—PCT/US2012/067992.
Apr. 15, 2013 ISR—PCT/US2012/068011.
May 14, 2013 ISR—PCT/US2012/067999.
May 17, 2013 ISR—PCT/US2012/067995.
Jun. 24, 2013 ISR (Partial)—PCT/US2012/067988.
Oct. 22, 2013 ISRWO—PCT/US2013/049744.
Oct. 22, 2013 ISRWO—PCT/US2013/049748.
Oct. 24, 2013 ISRWO—PCT/US2013/049755.
Nov. 7, 2013 ISRWO—PCT/US2013/049753.
Nov. 29, 2013 ISRWO—PCT/US2013/055434.
Nov. 29, 2013 ISRWO—PCT/US2013/055438.
Dec. 9, 2013 ISRWO—PCT/US2013/055436.
Soewito et al., "Self-Adressable Memory-Based FSM: A scalable Intrusion Detection Engine", Feb. 2009, IEEE Network, pp. 14-21.
Roth et al., "Fundamental of Logic Design," 2010, Cengage Learning, 6th Edition, pp. 1-780.
Hurson A. R.; A VLSI Design for the Parallel Finite State Automation and Its Performance Evaluation as a Hardware Scanner; International Journal of Computer and Information Sciences, vol. 13, No. 6. (1984).
Lipovski, G.; Dynamic Systolic Associative Memory Chip; IEEE; Department of Electrical and Computer Engineering; University of Texas at Austin; pp. 481-492 (1990).
Prais et al., Method for Address Decode for Memory Card, IP.Com Journal, IP.Com Inc., vol. 33. No. 2 (1990).
Bird, S. et al.; One-Level Phonology: Autosegmental Representations and Rules as Finite Automata; Association for Computational Linguistics; University of Edinburgh; vol. 20; No. 1; pp. 55-90 (1994).
Shafai, F. et al.; Fully Parallel 30-MHz, 2.5-Mb CAM; IEEE Journal of Solid-State Circuits, vol. 33; No. 11; pp. 1690-1696 (Nov. 1998).
Beesley, K. R.; Arabic Morphology Using Only Finite-State Operations; Xerox Research Centre Europe; pp. 50-57 (1998).
Wada, T.; Multiobject Behavior Recognition Event Driven Selective Attention Method; IEEE; pp. 1-16 (2000).
Fisk, M. et al.; Applying Fast String Matching to Intrusion Detection; Los Alamos National Laboratory; University of California San Diego; pp. 1-21 (Sep. 2001).
Sidhu, R. et al.; Fast Regular Expression Pattern Matching using FPGAs; Department of EE-Systems; University of Southern California; pp. 1-12 (2001).
Clark, C.; Design of Efficient FPGA Circuits for Matching Complex Patterns in Network Intrusion Detection Systems (Master of Science Thesis); Georgia Institute of Technology; pp. 1-56 (Dec. 2003).
Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9 (2004).
Fide, S.; String Processing in Hardware; Scalable Parallel and Distributed Systems Lab; Proceedings of the 12th Annual IEEE symposium on Field-Programmable Custom Computing Machines (FCCM'04);School of Electrical and Computer Engineering; Georgia Institute of Technology; pp. 1-9 (2004).
Clark, C. et al.; A Unified Model of Pattern-Matching Circuit Architectures; Tech Report GIT-CERCS-05-20;Georgia Institute of Technology; pp. 1-17 (2005).
Bispo, J. et al.; Regular Expression Matching for Reconfigurable Packet Inspection; IEEE (2006).
Brodie, B. et al.; A scalable Architecture for High-Throughput Regular-Expression Pattern Matching; Exegy Inc.; pp. 112 (2006).
Clark, C.; A Unified Model of Pattern-Matching Circuits for Field-Programmable Gate Arrays [Doctoral Dissertation]; Georgia Institute of Technology; pp. 1-177 (2006).
Korenek, J.; Traffic Scanner-Hardware Accelerated Intrusion Detection System; http://www.liberouter.org/; (2006).
Yu, F.; High Speed Deep Packet Inspection with Hardware Support; Electrical Engineering and Computer Sciences; University of California at Berkeley; pp. 1-217 (Nov. 22, 2006).
Bispo, J. et al.; Synthesis of Regular Expressions Targeting FPGAs: Current Status and Open Issues; IST/INESC-ID, Libson, Portugal; pp. 1-12 (2007).
Freescale and Kaspersky ® Accelerated Antivirus Solution Platform for OEM Vendors; Freescale Semiconductors Document; pp. 1-16 (2007).
Kumar, S. et al.; Curing Regular Expressions matching Algorithms from Insomnia, Amnesia, and Acaluia; Department of Computer Science and Engineering; Washington University in St. Louis; pp. 1-17 (Apr. 27, 2007).
Lin, C. et al.; Optimization of Pattern Matching Circuits for Regular Expression on FPGA; IEEE Transactions on Very Large Scale Integrations Systems; vol. 15, No. 12, pp. 1-6 (Dec. 2007).
Vitanen et al., "Image Pattern Recognition Using Configurable Logic Cell Array", To Appear in Proc Computer Graphics International, Leeks UK, 1989.
Cong et al., "Application-Specific Instruction Generation for Configurable Processor Architectures", Computer Science Department, University of California, ACM 2004.

(56) References Cited

OTHER PUBLICATIONS

Carpenter et al., "A Massively Parallel Architecture for a Self-Organizing Neural Pattern Recognition Machine", Academic Press, Inc. 1987.
Kutrib et al., "Massively Parallel Pattern Recognition with Link Features", IFIG Research Report 0003, 2000.
Glette et al., "An Online EHW Pattern Recognition System Applied to Face Image Recognition", University of Oslo, Norway, 2007.
Kawai et al., "An Adaptive Pattern Recognition Hardware with On-chip Shift Register-based Partial Reconfiguration", IEEE 2008.
Yasunaga et al., "Kernel-based Pattern Recognition Hardware: Its Design Methodology Using Evolved Truth Tables", IEEE, 2000.
PCT International Search Report and Written Opinion dated Jul. 24, 2014.
TW Office Action Maiied Oct. 12, 2015.
Japanese Office Action for JP Application No. 2016-50291 dated Mar. 21, 2017; 2 Pages.
Chinese Office Action for CN Application 201480015637.6 dated Apr. 28, 2017; 6 Pages.

\* cited by examiner

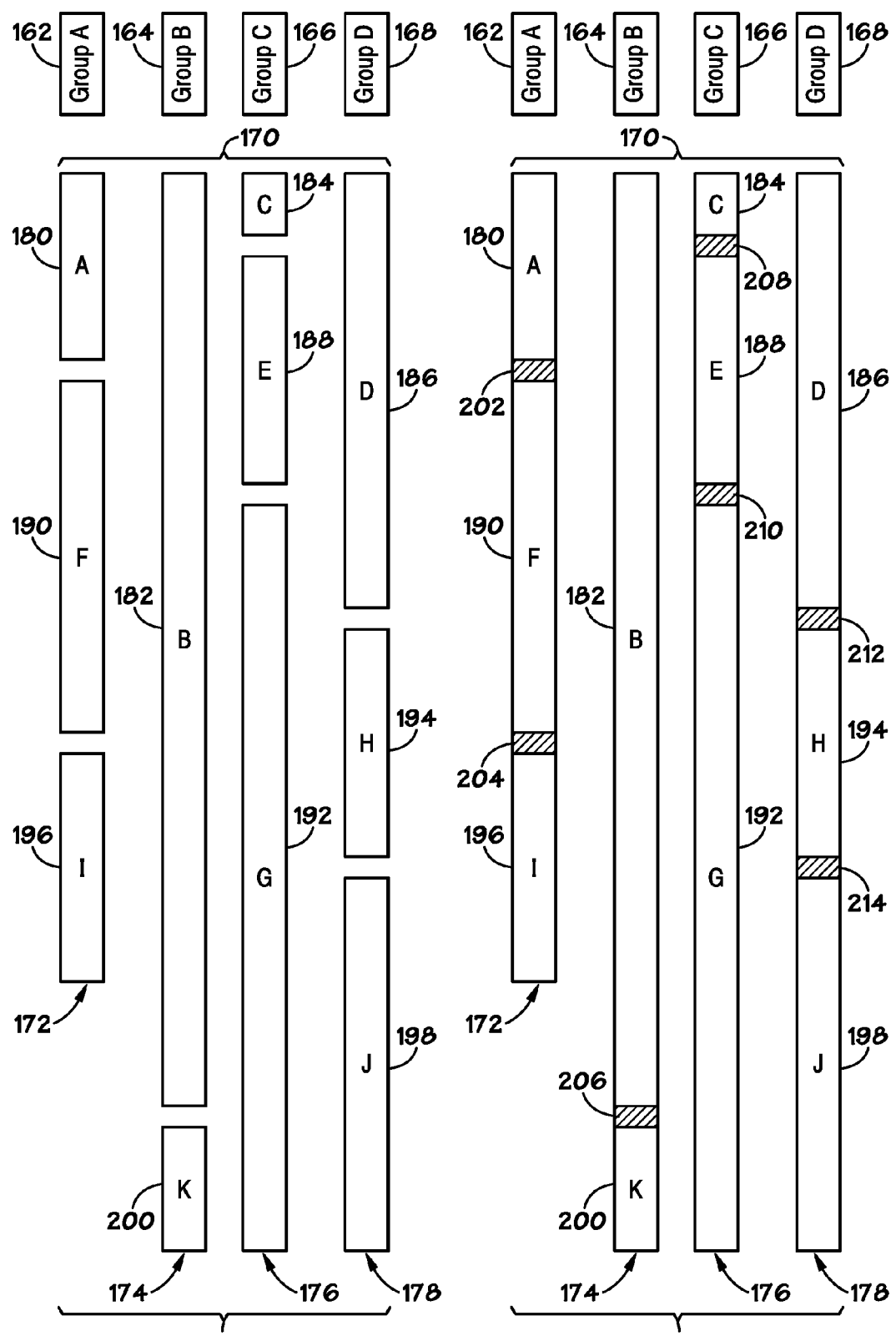

| Write Count | DDR3 Interface View - Byte Numbers ||||||||  Data Buffer Address | Target |
|---|---|---|---|---|---|---|---|---|---|---|
| | F0 | F1 | F2 | F3 | F4 | F5 | F6 | F7 | | |
| 0 | 0 | 1 | 2 | 3 | 4 | 5 | 6 | 7 | 0 | |
| 1 | 8 | 9 | 10 | 11 | 12 | 13 | 14 | 15 | 8 | |
| 2 | 16 | 17 | 18 | 19 | 20 | 21 | 22 | 23 | 16 | |
| 3 | 24 | 25 | 26 | 27 | 28 | 29 | 30 | 31 | 24 | Group 0 Data |
| ... | ... | ... | ... | ... | ... | ... | ... | ... | ... | |
| 508 | 4064 | 4065 | 4066 | 4067 | 4068 | 4069 | 4070 | 4071 | 4064 | |
| 509 | 4072 | 4073 | 4074 | 4075 | 4076 | 4077 | 4078 | 4079 | 4072 | |
| 510 | 4080 | 4081 | 4082 | 4083 | 4084 | 4085 | 4086 | 4087 | 4080 | |
| 511 | 4088 | 4089 | 4090 | 4091 | 4092 | 4093 | 4094 | 4095 | 4088 | |
| 512 | 4096 | 4097 | 4098 | 4099 | 4100 | 4101 | 4102 | 4103 | 1 | |
| 513 | 4104 | 4105 | 4106 | 4107 | 4108 | 4109 | 4110 | 4111 | 9 | |
| 514 | 4112 | 4113 | 4114 | 4115 | 4116 | 4117 | 4118 | 4119 | 17 | |
| 515 | 4120 | 4121 | 4122 | 4123 | 4124 | 4125 | 4126 | 4127 | 25 | Group 1 Data |
| ... | ... | ... | ... | ... | ... | ... | ... | ... | ... | |
| 1020 | 8160 | 8161 | 8162 | 8163 | 8164 | 8165 | 8166 | 8167 | 4065 | |
| 1021 | 8168 | 8169 | 8170 | 8170 | 8172 | 8173 | 8174 | 8175 | 4073 | |
| 1022 | 8176 | 8177 | 8178 | 8179 | 8180 | 8181 | 8182 | 8183 | 4081 | |
| 1023 | 8184 | 8185 | 8186 | 8187 | 8188 | 8189 | 8190 | 8191 | 4089 | |
| 1024 | 8192 | 8193 | 8194 | 8195 | 8196 | 8197 | 8198 | 8199 | 2 | |
| 1025 | 8200 | 8201 | 8202 | 8203 | 8204 | 8205 | 8206 | 8207 | 10 | |
| 1026 | 8208 | 8209 | 8210 | 8211 | 8212 | 8213 | 8214 | 8215 | 18 | |
| 1027 | 8216 | 8217 | 8218 | 8219 | 8220 | 8221 | 8222 | 8223 | 26 | Group 2 Data |
| ... | ... | ... | ... | ... | ... | ... | ... | ... | ... | |
| 1532 | 12256 | 12257 | 12258 | 12259 | 12260 | 12261 | 12262 | 12263 | 4066 | |
| 1533 | 12264 | 12265 | 12266 | 12267 | 12268 | 12269 | 12270 | 12271 | 4074 | |
| 1534 | 12272 | 12273 | 12274 | 12275 | 12276 | 12277 | 12278 | 12279 | 4082 | |
| 1535 | 12280 | 12281 | 12282 | 12283 | 12284 | 12285 | 12286 | 12287 | 4090 | |
| 1536 | 12288 | 12289 | 12290 | 12291 | 12292 | 12293 | 12294 | 12295 | 3 | |
| 1537 | 12296 | 12297 | 12298 | 12299 | 12300 | 12301 | 12302 | 12303 | 11 | |
| 1538 | 12304 | 12305 | 12306 | 12307 | 12308 | 12309 | 12310 | 12311 | 19 | |
| 1539 | 12312 | 12313 | 12314 | 12315 | 12316 | 12317 | 12318 | 12319 | 27 | Group 3 Data |
| ... | ... | ... | ... | ... | ... | ... | ... | ... | ... | |
| 2044 | 16352 | 16353 | 16354 | 16355 | 16356 | 16357 | 16358 | 16359 | 4067 | |
| 2045 | 16360 | 16361 | 16362 | 16363 | 16364 | 16365 | 16366 | 16367 | 4075 | |
| 2046 | 16368 | 16369 | 16370 | 16371 | 16372 | 16373 | 16374 | 16375 | 4083 | |
| 2047 | 16376 | 16377 | 16378 | 16379 | 16380 | 16381 | 16382 | 16383 | 4091 | |
| 2048 | 16384 | 16385 | 16386 | 16387 | 16388 | 16389 | 16390 | 16391 | 4 | |
| 2049 | 16392 | 16393 | 16394 | 16395 | 16396 | 16397 | 16398 | 16390 | 12 | |
| 2050 | 16400 | 16401 | 16402 | 16403 | 16404 | 16405 | 16406 | 16407 | 20 | |
| 2051 | 16408 | 16409 | 16410 | 16411 | 16412 | 16413 | 16414 | 16415 | 28 | Group 4 Data |
| ... | ... | ... | ... | ... | ... | ... | ... | ... | ... | |
| 2556 | 20448 | 20449 | 20450 | 20451 | 20452 | 20453 | 20454 | 20455 | 4068 | |
| 2557 | 29456 | 29457 | 29458 | 29459 | 29460 | 29461 | 29462 | 29463 | 4076 | |
| 2558 | 20464 | 20465 | 20466 | 20467 | 20468 | 20469 | 20470 | 20471 | 4084 | |
| 2559 | 20472 | 20473 | 20474 | 20475 | 20476 | 20477 | 20478 | 20479 | 4092 | |
| 2560 | 20480 | 20481 | 20482 | 20483 | 20484 | 20485 | 20486 | 20487 | 5 | |
| 2561 | 20488 | 20489 | 20490 | 20491 | 20492 | 20493 | 20494 | 20495 | 13 | |
| 2562 | 20496 | 20497 | 20498 | 20499 | 20500 | 20501 | 20502 | 20503 | 21 | |
| 2563 | 20504 | 20505 | 20506 | 20507 | 20508 | 20509 | 20510 | 20511 | 29 | Group 5 Data |
| ... | ... | ... | ... | ... | ... | ... | ... | ... | ... | |
| 3068 | 24544 | 24545 | 24546 | 24547 | 24548 | 24549 | 24550 | 24551 | 4069 | |
| 3069 | 24552 | 24553 | 24554 | 24555 | 24556 | 24557 | 24558 | 24559 | 4077 | |
| 3070 | 24560 | 24561 | 24562 | 24563 | 24564 | 24565 | 24566 | 24567 | 4085 | |
| 3071 | 24568 | 24569 | 24570 | 24571 | 24572 | 24573 | 24574 | 24575 | 4093 | |
| 3072 | 24576 | 24577 | 24578 | 24579 | 24580 | 24581 | 24582 | 24583 | 6 | |
| 3073 | 24584 | 24585 | 24586 | 24587 | 24588 | 24589 | 24590 | 24591 | 14 | |
| 3074 | 24592 | 24593 | 24594 | 24595 | 24596 | 24597 | 24598 | 24599 | 22 | |
| 3075 | 24600 | 24601 | 24602 | 24603 | 24604 | 24605 | 24606 | 24607 | 30 | Group 6 Data |
| ... | ... | ... | ... | ... | ... | ... | ... | ... | ... | |
| 3580 | 28640 | 28641 | 28642 | 28643 | 28644 | 28645 | 28646 | 28647 | 4070 | |
| 3581 | 28648 | 28649 | 28650 | 28651 | 28652 | 28653 | 28654 | 28655 | 4078 | |
| 3582 | 28656 | 28657 | 28658 | 28659 | 28660 | 28661 | 28662 | 28663 | 4086 | |
| 3583 | 28664 | 28665 | 28666 | 28667 | 28668 | 28669 | 28670 | 28671 | 4094 | |
| 3584 | 28672 | 28673 | 28674 | 28675 | 28676 | 28677 | 28678 | 28679 | 7 | |
| 3585 | 28680 | 28681 | 28682 | 28683 | 28684 | 28685 | 28686 | 28687 | 15 | |
| 3586 | 28688 | 28689 | 28690 | 28691 | 28692 | 28693 | 28694 | 28695 | 23 | |
| 3587 | 28696 | 28697 | 28698 | 28699 | 28700 | 28701 | 28702 | 28703 | 31 | Group 7 Data |
| ... | ... | ... | ... | ... | ... | ... | ... | ... | ... | |
| 4092 | 32736 | 32737 | 32738 | 32739 | 32740 | 32741 | 32742 | 32743 | 4071 | |
| 4093 | 32744 | 32745 | 32746 | 32747 | 32748 | 32749 | 32750 | 32751 | 4079 | |
| 4094 | 32752 | 32753 | 32754 | 32755 | 32756 | 32757 | 32758 | 32759 | 4087 | |
| 4095 | 32760 | 32761 | 32762 | 32763 | 32764 | 32765 | 32766 | 32767 | 4095 | |

FIG. 18

| Process Buffer View - Byte Numbers | | | | | | | | |
|---|---|---|---|---|---|---|---|---|
| | F0 | F1 | F2 | F3 | F4 | F5 | F6 | F7 |
| Process Buffer A | 0 | 4096 | 8192 | 12288 | 16384 | 20480 | 24576 | 28672 |
| | 1 | 4097 | 8193 | 12289 | 16385 | 20481 | 24577 | 28673 |
| | 2 | 4098 | 8194 | 12290 | 16386 | 20482 | 24578 | 28674 |
| | 3 | 4099 | 8195 | 12291 | 16387 | 20483 | 24579 | 28675 |
| | 4 | 4100 | 8196 | 12292 | 16388 | 20484 | 24580 | 28676 |
| | 5 | 4101 | 8197 | 12293 | 16389 | 20485 | 24581 | 28677 |
| | 6 | 4102 | 8198 | 12294 | 16390 | 20486 | 24582 | 28678 |
| | 7 | 4103 | 8199 | 12295 | 16391 | 20487 | 24583 | 28679 |
| Process Buffer B | 8 | 4104 | 8200 | 12296 | 16392 | 20488 | 24584 | 28680 |
| | 9 | 4105 | 8201 | 12297 | 16393 | 20489 | 24585 | 28681 |
| | 10 | 4106 | 8202 | 12298 | 16394 | 20490 | 24586 | 28682 |
| | 11 | 4107 | 8203 | 12299 | 16395 | 20491 | 24587 | 28683 |
| | 12 | 4108 | 8204 | 12300 | 16396 | 20492 | 24588 | 28684 |
| | 13 | 4109 | 8205 | 12301 | 16397 | 20493 | 24589 | 28685 |
| | 14 | 4110 | 8206 | 12302 | 16398 | 20494 | 24590 | 28686 |
| | 15 | 4111 | 8207 | 12303 | 16399 | 20495 | 24591 | 28687 |

| F0 | F1 | F2 | F3 | F4 | F5 | F6 | F7 | Data Buffer Address |
|---|---|---|---|---|---|---|---|---|
| 0 | 1 | 2 | 3 | 4 | 5 | 6 | 7 | 0 |
| 4096 | 4097 | 4098 | 4099 | 4100 | 4101 | 4102 | 4103 | 1 |
| 8192 | 8193 | 8194 | 8195 | 8196 | 8197 | 8198 | 8199 | 2 |
| 12288 | 12289 | 12290 | 12291 | 12292 | 12293 | 12294 | 12295 | 3 |
| 16384 | 16385 | 16386 | 16387 | 16388 | 16389 | 16390 | 16391 | 4 |
| 20480 | 20481 | 20482 | 20483 | 20484 | 20485 | 20486 | 20487 | 5 |
| 24576 | 24577 | 24578 | 24579 | 24580 | 24581 | 24582 | 24583 | 6 |
| 28672 | 28673 | 28674 | 28675 | 28676 | 28677 | 28678 | 28679 | 7 |
| 8 | 9 | 10 | 11 | 12 | 13 | 14 | 15 | 8 |
| 4104 | 4105 | 4106 | 4107 | 4108 | 4109 | 4110 | 4111 | 9 |
| 8200 | 8201 | 8202 | 8203 | 8204 | 8205 | 8206 | 8207 | 10 |
| 12296 | 12297 | 12298 | 12299 | 12300 | 12301 | 12302 | 12303 | 11 |
| 16392 | 16393 | 16394 | 16395 | 16396 | 16397 | 16398 | 16399 | 12 |
| 20488 | 20489 | 20490 | 20491 | 20492 | 20493 | 20494 | 20495 | 13 |
| 24584 | 24585 | 24586 | 24587 | 24588 | 24589 | 24590 | 24591 | 14 |
| 28680 | 28681 | 28682 | 28683 | 28684 | 28685 | 28686 | 28687 | 15 |
| Data Buffer View - Byte Numbers | | | | | | | | |

| Write Count | DDR3 Interface View — Byte Numbers | | | | | | | | Data Buffer Address | Target |
|---|---|---|---|---|---|---|---|---|---|---|
| | F0 | F1 | F2 | F3 | F4 | F5 | F6 | F7 | | |
| 0 | 0 | 1 | 2 | 3 | 4 | 5 | 6 | 7 | 0 | |
| 1 | 8 | 9 | 10 | 11 | 12 | 13 | 14 | 15 | 1 | |
| 2 | 16 | 17 | 18 | 19 | 20 | 21 | 22 | 23 | 2 | Group 0 Data |
| 3 | 24 | 25 | 26 | 27 | 28 | 29 | 30 | 31 | 3 | |
| ... | ... | ... | ... | ... | ... | ... | ... | ... | ... | |
| 4092 | 32736 | 32737 | 32738 | 32739 | 32740 | 32741 | 32742 | 32743 | 4092 | |
| 4093 | 32744 | 32745 | 32746 | 32747 | 32748 | 32749 | 32750 | 32751 | 4093 | |
| 4094 | 32752 | 32753 | 32754 | 32755 | 32756 | 32757 | 32758 | 32759 | 4094 | |
| 4095 | 32760 | 32761 | 32762 | 32763 | 32764 | 32765 | 32766 | 32767 | 4095 | |

FIG. 21

Process Buffer View - Byte Numbers

| | F0 | F1 | F2 | F3 | F4 | F5 | F6 | F7 |
|---|---|---|---|---|---|---|---|---|
| Process Buffer A | 0 | 0 | 0 | 0 | 0 | 0 | 0 | 0 |
| | 1 | 1 | 1 | 1 | 1 | 1 | 1 | 1 |
| | 2 | 2 | 2 | 2 | 2 | 2 | 2 | 2 |
| | 3 | 3 | 3 | 3 | 3 | 3 | 3 | 3 |
| | 4 | 4 | 4 | 4 | 4 | 4 | 4 | 4 |
| | 5 | 5 | 5 | 5 | 5 | 5 | 5 | 5 |
| | 6 | 6 | 6 | 6 | 6 | 6 | 6 | 6 |
| | 7 | 7 | 7 | 7 | 7 | 7 | 7 | 7 |
| Process Buffer B | 8 | 8 | 8 | 8 | 8 | 8 | 8 | 8 |
| | 9 | 9 | 9 | 9 | 9 | 9 | 9 | 9 |
| | 10 | 10 | 10 | 10 | 10 | 10 | 10 | 10 |
| | 11 | 11 | 11 | 11 | 11 | 11 | 11 | 11 |
| | 12 | 12 | 12 | 12 | 12 | 12 | 12 | 12 |
| | 13 | 13 | 13 | 13 | 13 | 13 | 13 | 13 |
| | 14 | 14 | 14 | 14 | 14 | 14 | 14 | 14 |
| | 15 | 15 | 15 | 15 | 15 | 15 | 15 | 15 |

Data Buffer View - Byte Numbers

| F0 | F1 | F2 | F3 | F4 | F5 | F6 | F7 | Data Buffer Address |
|---|---|---|---|---|---|---|---|---|
| 0 | 1 | 2 | 3 | 4 | 5 | 6 | 7 | 0 |
| 8 | 9 | 10 | 11 | 12 | 13 | 14 | 15 | 1 |
| 16 | 17 | 18 | 19 | 20 | 21 | 22 | 23 | 2 |
| 24 | 25 | 26 | 27 | 28 | 29 | 30 | 31 | 3 |
| 32 | 33 | 34 | 35 | 36 | 37 | 38 | 39 | 4 |
| 40 | 41 | 42 | 43 | 44 | 45 | 46 | 47 | 5 |
| 48 | 49 | 50 | 51 | 52 | 53 | 54 | 55 | 6 |
| 56 | 57 | 58 | 59 | 60 | 61 | 62 | 63 | 7 |
| 64 | 65 | 66 | 67 | 68 | 69 | 70 | 71 | 8 |
| 72 | 73 | 74 | 75 | 76 | 77 | 78 | 79 | 9 |
| 80 | 81 | 82 | 83 | 84 | 85 | 86 | 87 | 10 |
| 88 | 89 | 90 | 91 | 92 | 93 | 94 | 95 | 11 |
| 96 | 97 | 98 | 99 | 100 | 101 | 102 | 103 | 12 |
| 104 | 105 | 106 | 107 | 108 | 109 | 110 | 111 | 13 |
| 112 | 113 | 114 | 115 | 116 | 117 | 118 | 119 | 14 |
| 120 | 121 | 122 | 123 | 124 | 125 | 126 | 127 | 15 |

METHODS AND APPARATUSES FOR PROVIDING DATA RECEIVED BY A PLURALITY OF STATE MACHINE ENGINES

CROSS-REFERENCE TO RELATED APPLICATION

This application a divisional of U.S. patent application Ser. No. 14/065,168, which was filed on Oct. 28, 2013 and claims priority to Provisional U.S. Patent Application Ser. No. 61/788,364, which was filed on Mar. 15, 2013.

BACKGROUND

Field of Invention

Embodiments of the invention relate generally to electronic devices and, more specifically, in certain embodiments, to electronic devices with parallel devices for data analysis.

Description of Related Art

Complex data analysis (e.g., pattern recognition) can be inefficient to perform on a conventional von Neumann based computer. A biological brain, in particular a human brain, however, is adept at performing complex data analysis. Current research suggests that a human brain performs data analysis using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex data analysis that enables humans to perform high level functions such as spatial reasoning, conscious thought, and complex language.

In the field of computing, pattern recognition tasks, for example, are increasingly challenging. Ever larger volumes of data are transmitted between computers, and the number of patterns that users wish to detect is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. However, there has not been a system that effectively allows for performing complex data analysis in a manner more comparable to that of a biological brain. Development of such a system is desirable.

BRIEF DESCRIPTION OF DRAWINGS

FIG. 11 illustrates an example of data segments grouped into data blocks to be provided to state machine engines, according to various embodiments of the invention.

FIG. 12 illustrates an example of data padding inserted between the data segments of the data blocks of FIG. 11, according to various embodiments of the invention.

FIG. 18 illustrates an example of data stored in data buffers of multiple physical state machine engines organized into multiple logical groups, according to various embodiments of the invention.

FIG. 19 illustrates an example of data stored in process buffers of multiple physical state machine engines organized into multiple logical groups, according to various embodiments of the invention.

FIG. 20 illustrates an example of data stored in data buffers of multiple physical state machine engines organized into one logical group, according to various embodiments of the invention.

FIG. 21 illustrates an example of data stored in process buffers of multiple physical state machine engines organized into one logical group, according to various embodiments of the invention.

DETAILED DESCRIPTION

Figure 1:
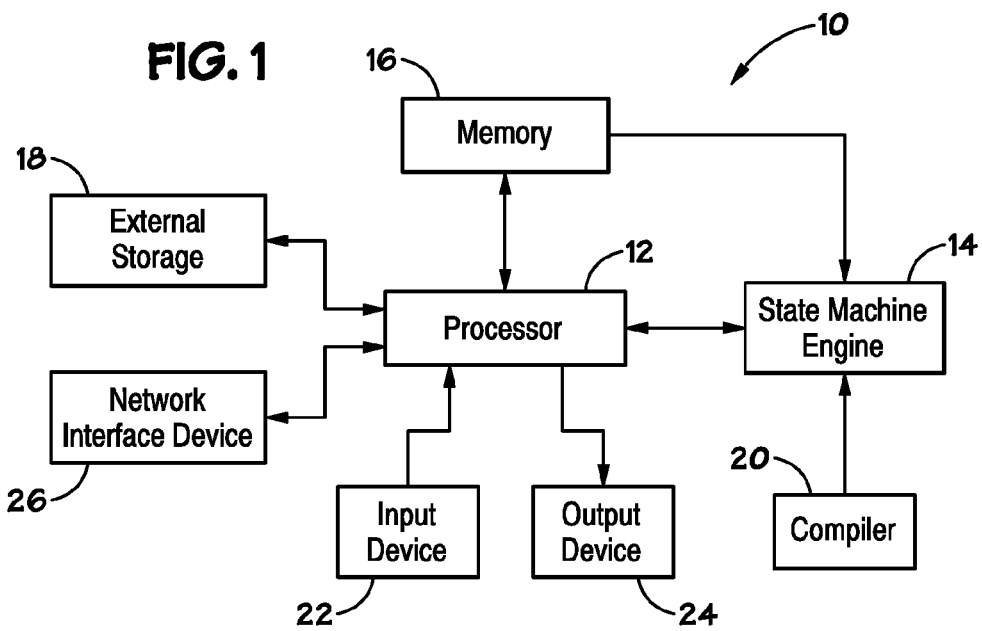
FIG. 1 illustrates an example of system having a state machine engine, according to various embodiments of the invention.

Turning now to the figures, FIG. 1 illustrates an embodiment of a processor-based system, generally designated by reference numeral 10. The system 10 (e.g., data analysis system) may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. As used herein, the state machine engine 14 refers to a single device (e.g., single chip). The state machine engine 14 may employ any automaton theory. For example, the state machine engine 14 may employ one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of the state machine engine 14). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 1000, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, send, transfer, transmit, generate, give, output, place, write, etc. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state machine elements (SMEs) 34, 36 (shown in FIG. 5) that are hierarchically organized into rows 38 (shown in FIGS. 3 and 4) and blocks 32 (shown in FIGS. 2 and 3). The SMEs may also be considered state transition elements (STEs). To route signals between the hierarchically organized SMEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A SME 34, 36 can correspond to a state of a FSM implemented by the FSM lattice 30. The SMEs 34, 36 can be coupled together by using the configurable switching elements as described below. Accordingly, a FSM can be implemented on the FSM lattice 30 by configuring the SMEs 34, 36 to correspond to the functions of states and by selectively coupling together the SMEs 34, 36 to correspond to the transitions between states in the FSM.

Figure 2:
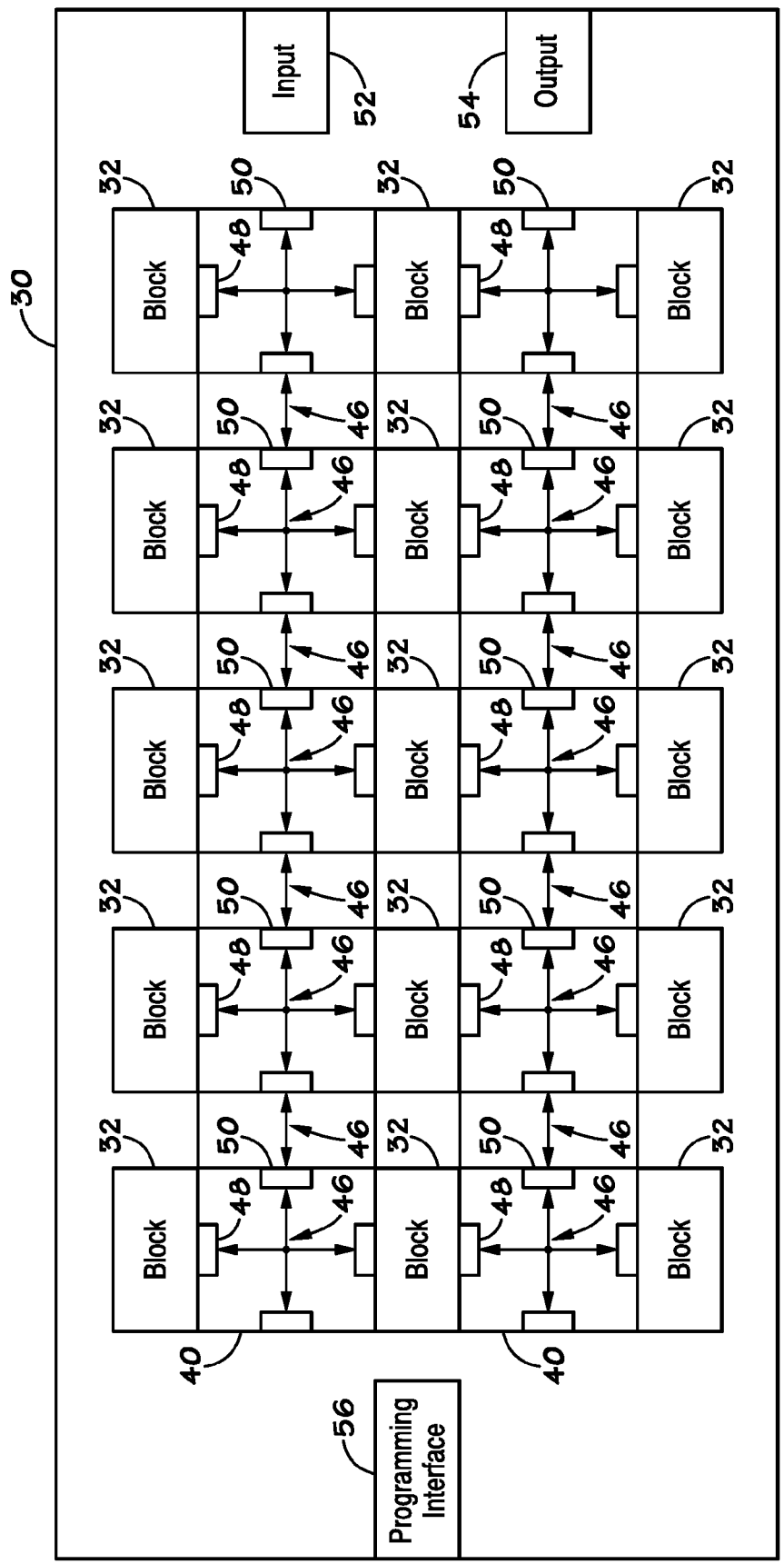
FIG. 2 illustrates an example of a finite state machine (FSM) lattice of the state machine engine of FIG. 1, according to various embodiments of the invention.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48 and 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the SMEs 34, 36. That is, the image can configure the SMEs 34, 36 to react in a certain way to a given input at the input block 52. For example, a SME 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the SMEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
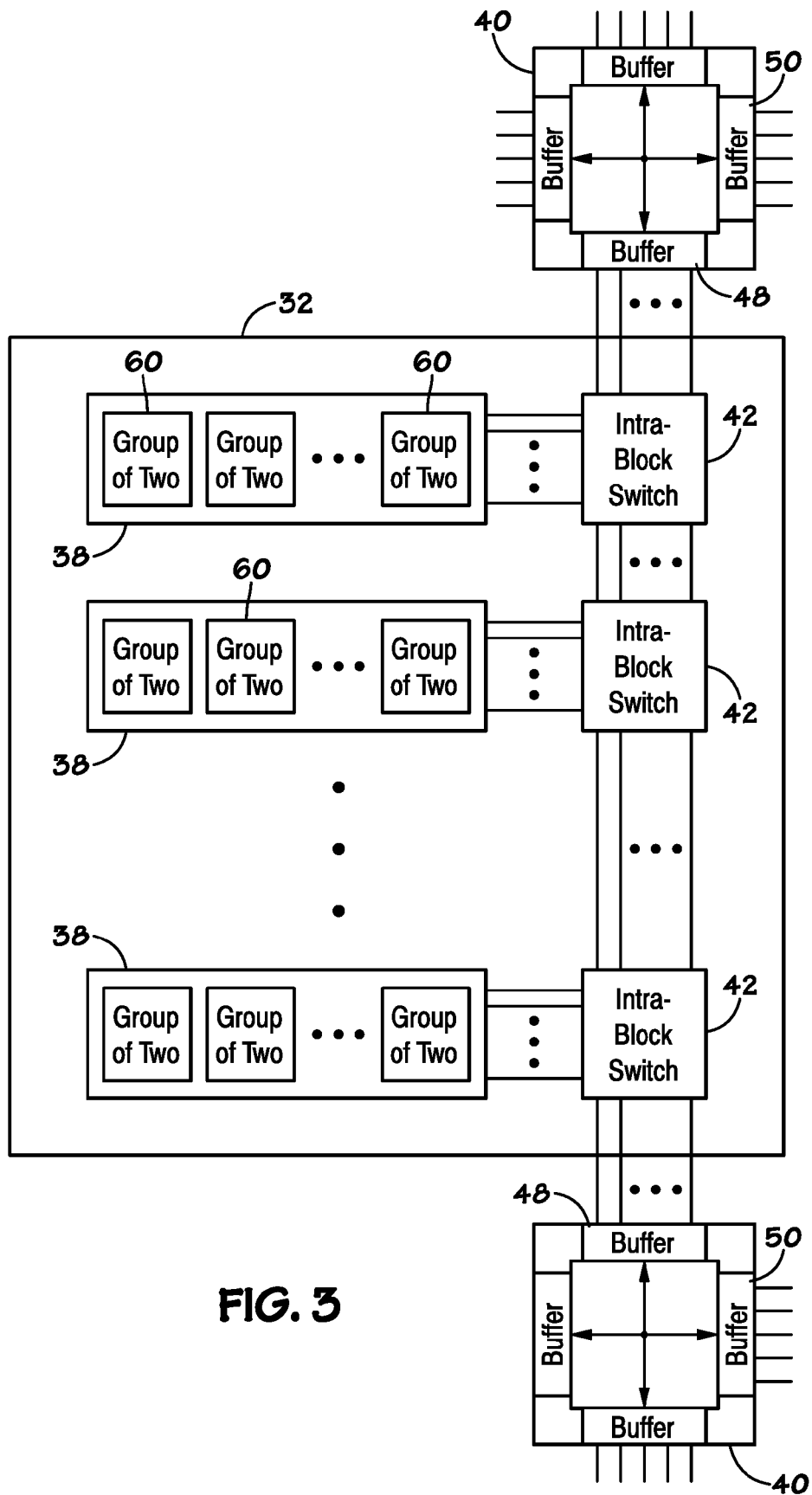
FIG. 3 illustrates an example of a block of the FSM lattice of FIG. 2, according to various embodiments of the invention.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of SMEs 34, 36 organized into pairs of elements that are referred to herein as groups of two (GOTs) 60. In an example, a block 32 comprises sixteen (16) rows 38.

Figure 4:
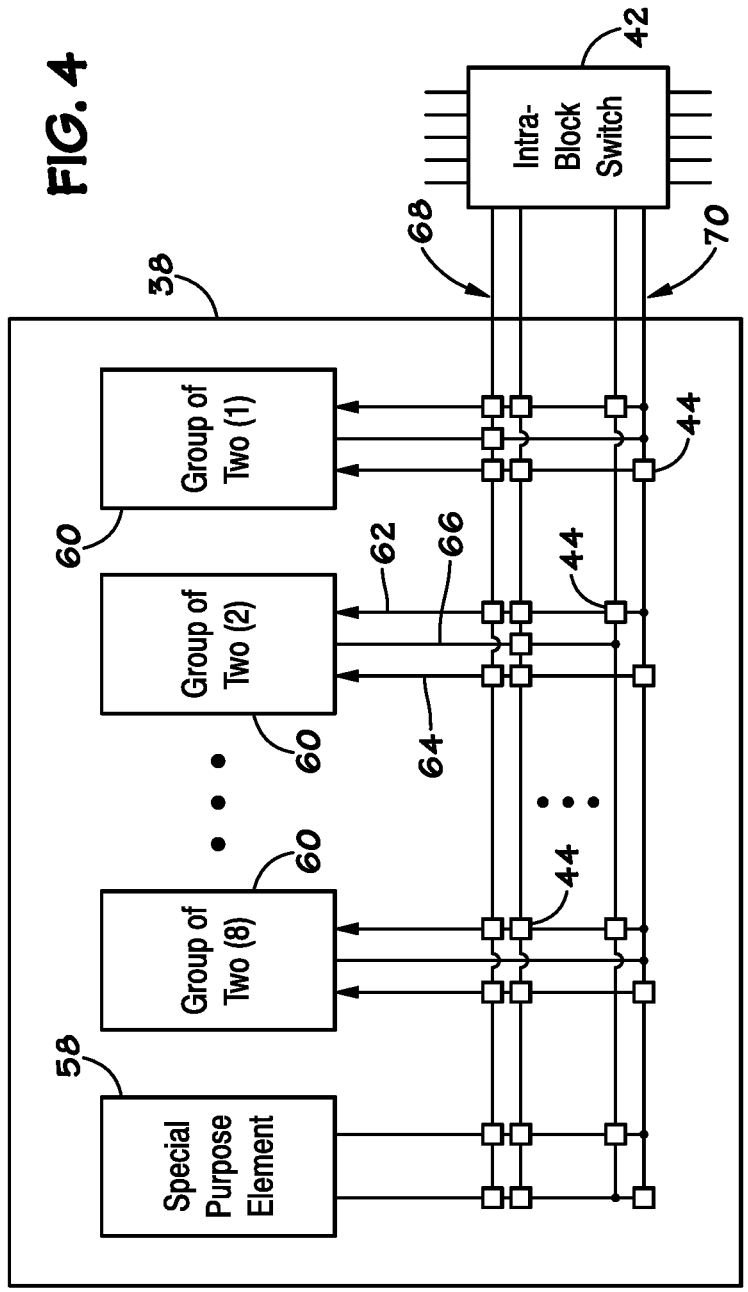
FIG. 4 illustrates an example of a row of the block of FIG. 3, according to various embodiments of the invention.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first SME 34 of the GOT 60 and the second input 64 is coupled to a second SME 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each SME 34, 36 of each GOT 60 within the row 38. A second plurality of the row interconnection conductors 70 can be coupled to only one SME 34, 36 of each GOT 60 within the row 38, but cannot be coupled to the other SME 34, 36 of the GOT 60. In an example, a first half of the second plurality of row interconnection conductors 70 can couple to first half of the SMEs 34, 36 within a row 38 (one SME 34 from each GOT 60) and a second half of the second plurality of row interconnection conductors 70 can couple to a second half of the SMEs 34, 36 within a row 38 (the other SME 34, 36 from each GOT 60), as will be better illustrated with respect to FIG. 5. The limited connectivity between the second plurality of row interconnection conductors 70 and the SMEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter 58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero and the clock cycles. The zero-count output is asserted during the next clock cycle of the counter 58. Resulting in the counter 58 being offset in time from the clock cycle. At the next clock cycle, the zero-count output is no longer asserted. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state SMEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 5:
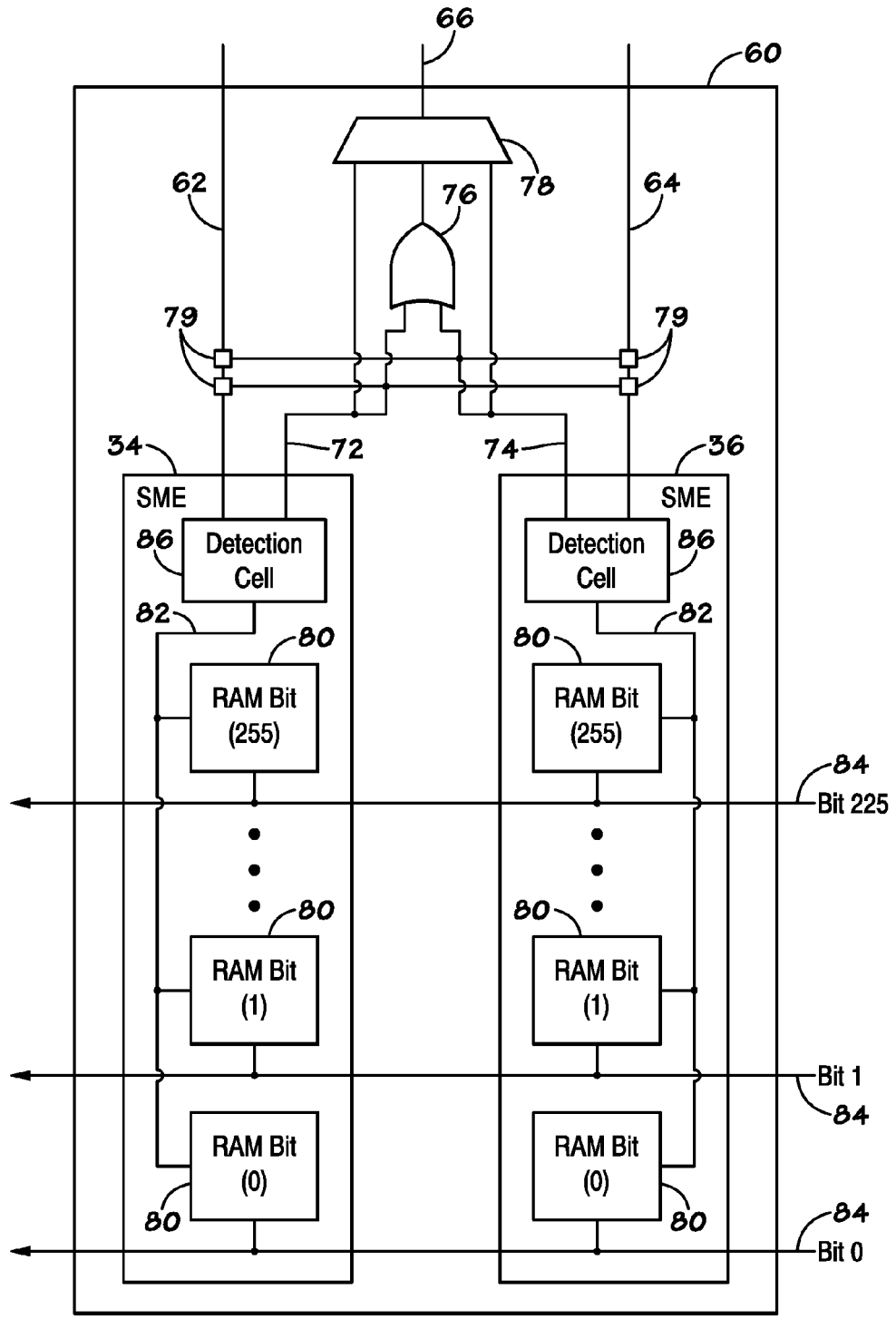
FIG. 5 illustrates an example of a Group of Two of the row of FIG. 4, according to various embodiments of the invention.

FIG. 5 illustrates an example of a GOT 60. The GOT 60 includes a first SME 34 and a second SME 36 having inputs 62, 64 and having their outputs 72, 74 coupled to an OR gate 76 and a 3-to-1 multiplexer 78. The 3-to-1 multiplexer 78 can be set to couple the output 66 of the GOT 60 to either the first SME 34, the second SME 36, or the OR gate 76. The OR gate 76 can be used to couple together both outputs 72, 74 to form the common output 66 of the GOT 60. In an example, the first and second SME 34, 36 exhibit parity, as discussed above, where the input 62 of the first SME 34 can be coupled to some of the row interconnect conductors 68 and the input 64 of the second SME 36 can be coupled to other row interconnect conductors 70 the common output 66 may be produced which may overcome parity problems. In an example, the two SMEs 34, 36 within a GOT 60 can be cascaded and/or looped back to themselves by setting either or both of switching elements 79. The SMEs 34, 36 can be cascaded by coupling the output 72, 74 of the SMEs 34, 36 to the input 62, 64 of the other SME 34, 36. The SMEs 34, 36 can be looped back to themselves by coupling the output 72, 74 to their own input 62, 64. Accordingly, the output 72 of the first SME 34 can be coupled to neither, one, or both of the input 62 of the first SME 34 and the input 64 of the second SME 36.

In an example, a state machine element 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective SME 34, 36. When in the active state, the detection cell 86 outputs a low signal on the respective output line 72, 74 when the signals from all of the memory cells 82 of the respective SME 34, 36 are low.

In an example, an SME 34, 36 includes 256 memory cells 80 and each memory cell 80 is coupled to a different data stream line 84. Thus, an SME 34, 36 can be programmed to output a high signal when a selected one or more of the data stream lines 84 have a high signal thereon. For example, the SME 34 can have a first memory cell 80 (e.g., bit 0) set high and all other memory cells 80 (e.g., bits 1-255) set low. When the respective detection cell 86 is in the active state, the SME 34 outputs a high signal on the output 72 when the data stream line 84 corresponding to bit 0 has a high signal thereon. In other examples, the SME 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the SMEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the SMEs 34, 36. For example, a first SME 34 can be set to an active state by setting the detection cell 86 to the active state. The first SME 34 can be set to output a high signal when the data stream line 84 corresponding to bit 0 has a high signal thereon. The second SME 36 can be initially set to an inactive state, but can be set to, when active, output a high signal when the data stream line 84 corresponding to bit 1 has a high signal thereon. The first SME 34 and the second SME 36 can be cascaded by setting the output 72 of the first SME 34 to couple to the input 64 of the second SME 36. Thus, when a high signal is sensed on the data stream line 84 corresponding to bit 0, the first SME 34 outputs a high signal on the output 72 and sets the detection cell 86 of the second SME 36 to an active state. When a high signal is sensed on the data stream line 84 corresponding to bit 1, the second SME 36 outputs a high signal on the output 74 to activate another SME 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a match of a given pattern, a word comprising a plurality of bits indicating matches and non-matches to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
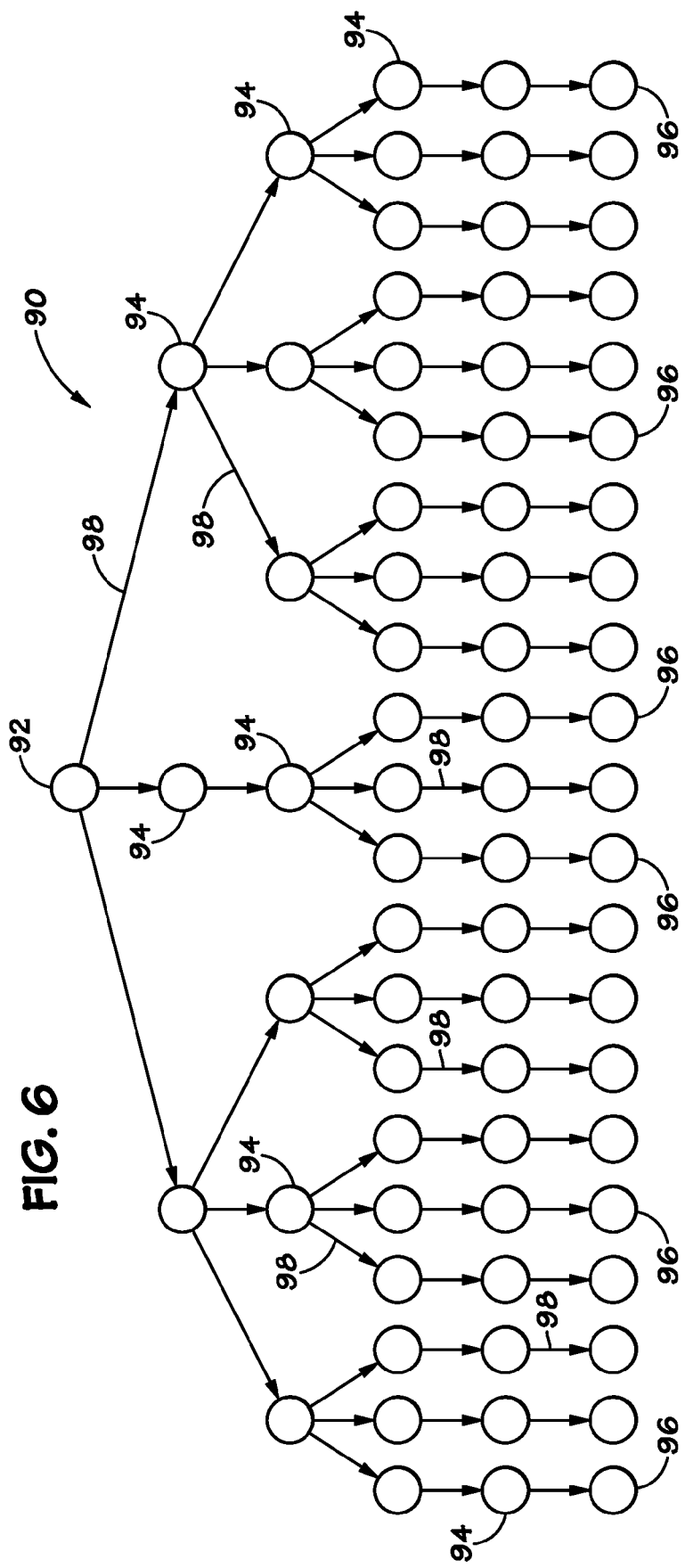
FIG. 6 illustrates an example of a finite state machine graph, according to various embodiments of the invention.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a match of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a match to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past events. For example, the one or more patterns of input data required to reach a terminal node 96 can be represented by the activation of that terminal node 96. In an example, the output provided by a terminal node 96 is binary, that is, the output indicates whether the pattern of interest has been matched or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
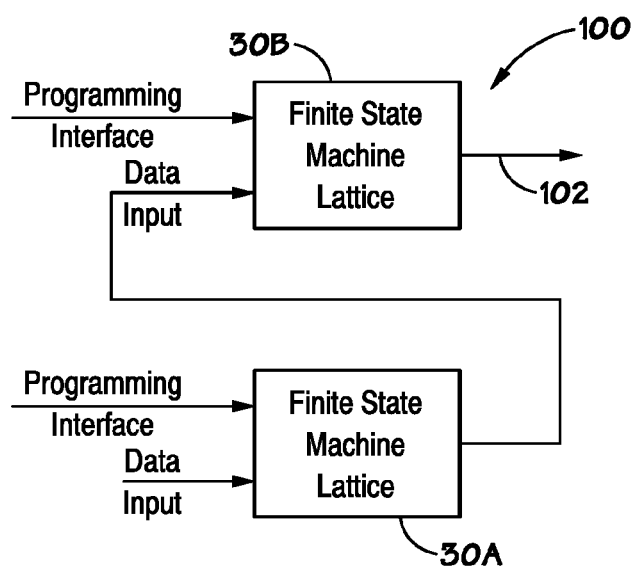
FIG. 7 illustrates an example of two-level hierarchy implemented with FSM lattices, according to various embodiments of the invention.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past events in a compressed word from a first FSM lattice 30A to a second FSM lattice 30B. The data provided can effectively be a summary of complex events (e.g., sequences of interest) that were recorded by the first FSM lattice 30A.

The two-level hierarchy 100 of FSM lattices 30A, 30B shown in FIG. 7 allows two independent programs to operate based on the same data stream. The two-stage hierarchy can be similar to visual recognition in a biological brain which is modeled as different regions. Under this model, the regions are effectively different pattern recognition engines, each performing a similar computational function (pattern matching) but using different programs (signatures). By connecting multiple FSM lattices 30A, 30B together, increased knowledge about the data stream input may be obtained.

The first level of the hierarchy (implemented by the first FSM lattice 30A) can, for example, perform processing directly on a raw data stream. That is, a raw data stream can be received at an input block 52 of the first FSM lattice 30A and the configurable elements of the first FSM lattice 30A can react to the raw data stream. The second level (implemented by the second FSM lattice 30B) of the hierarchy can process the output from the first level. That is, the second FSM lattice 30B receives the output from an output block 54 of the first FSM lattice 30A at an input block 52 of the second FSM lattice 30B and the configurable elements of the second FSM lattice 30B can react to the output of the first FSM lattice 30A. Accordingly, in this example, the second FSM lattice 30B does not receive the raw data stream as an input, but rather receives the indications of patterns of interest that are matched by the raw data stream as determined by the first FSM lattice 30A. The second FSM lattice 30B can implement a FSM that recognizes patterns in the output data stream from the first FSM lattice 30A. It should be appreciated that the second FSM lattice 30B may receive inputs from multiple other FSM lattices in addition to receiving output from the FSM lattice 30A. Likewise, the second FSM lattice 30B may receive inputs from other devices. The second FSM lattice 30B may combine these multiple inputs to produce outputs.

Figure 8:
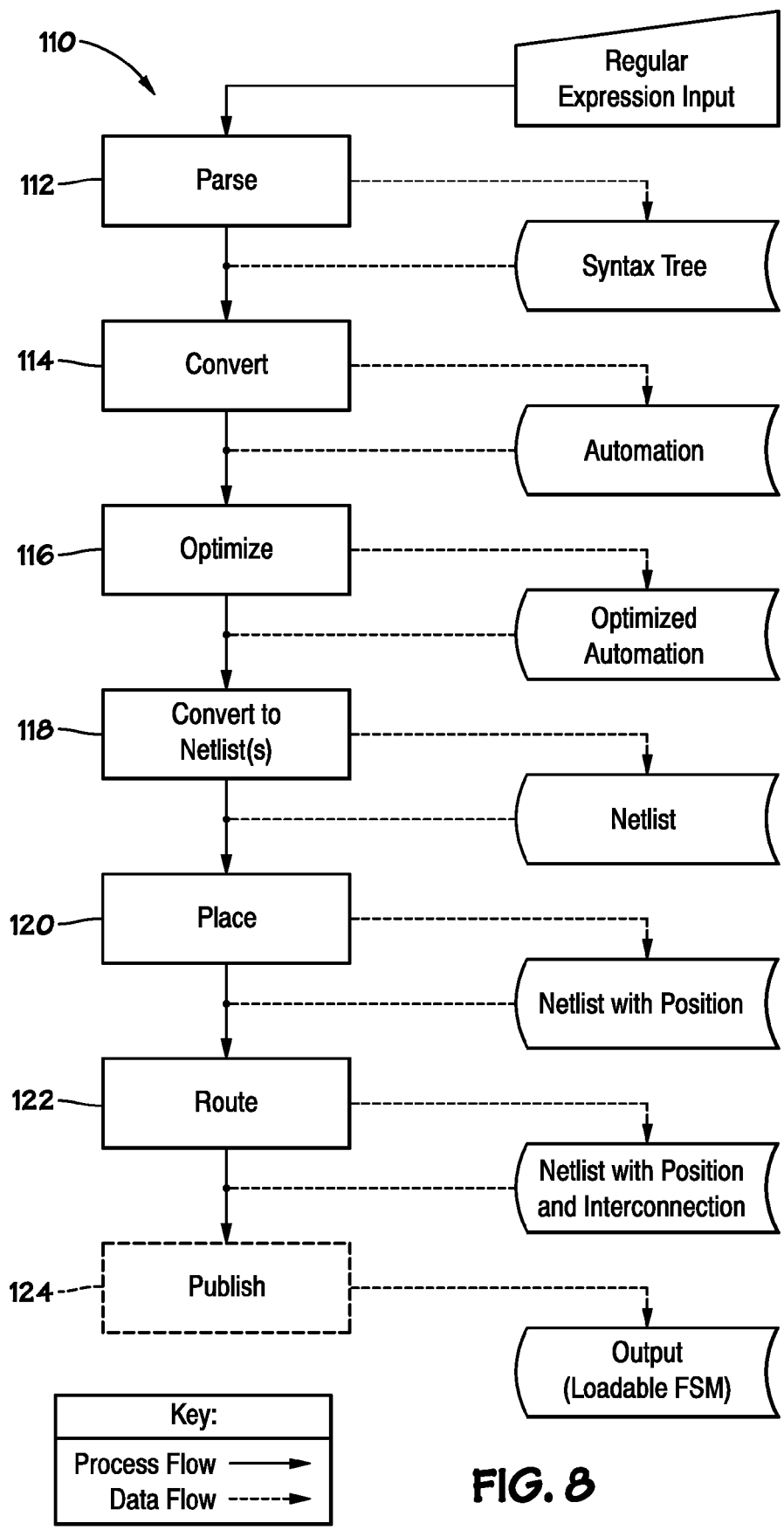
FIG. 8 illustrates an example of a method for a compiler to convert source code into a binary file for programming of the FSM lattice of FIG. 2, according to various embodiments of the invention.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexs). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexs in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. That is, different operators can correspond to different functions implemented by the regexes in the source code.

At block 114, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states. In an example, the automaton can be converted based partly on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol $\alpha$, i.e. $\delta(p, \alpha)$, is shown by a directed connection from node p to node q. In an example, a reversal of an automaton produces a new automaton where each transition p→q on some symbol $\alpha$ is reversed q→p on the same symbol. In a reversal, start state becomes a final state and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., SMEs 34, 36, other elements) on the FSM lattice 30, and determines the connections between the hardware elements.

At block 120, the netlist is placed to select a specific hardware element of the target device (e.g., SMEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements that placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of SMEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the SMEs 34, 36 and other hardware elements or by loading the image into one or more registers and then writing the bit values from the registers to the SMEs 34, 36 and other hardware elements. In an example, the hardware elements (e.g., SMEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
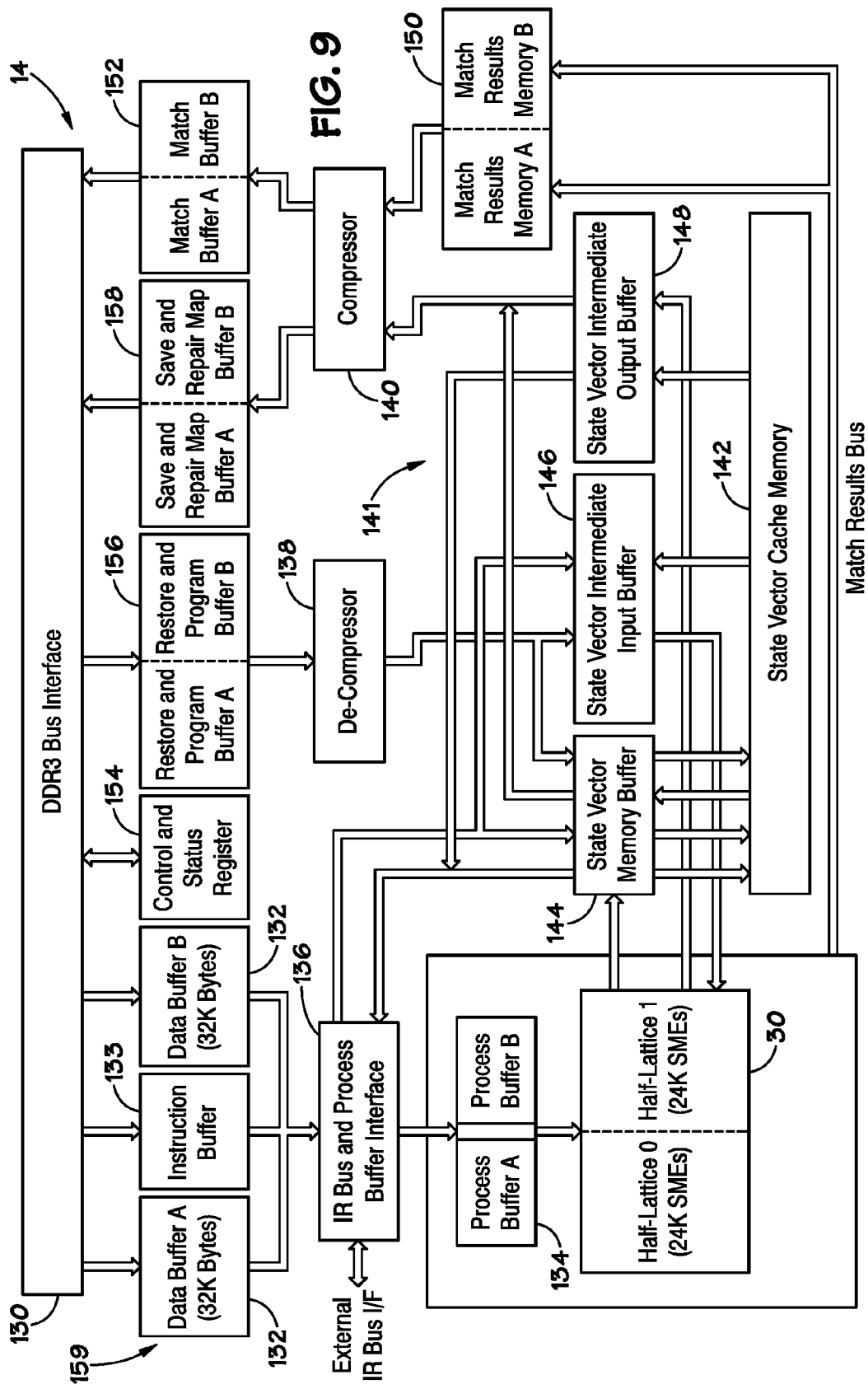
FIG. 9 illustrates a state machine engine, according to various embodiments of the invention.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMII), etc. As previously described, the state machine engine 14 includes one or more FSM lattices 30 configured to analyze data. Each FSM lattice 30 may be divided into two half-lattices. In the illustrated embodiment, each half lattice may include 24K SMEs (e.g., SMEs 34, 36), such that the lattice 30 includes 48K SMEs. The lattice 30 may comprise any desirable number of SMEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes data buffers 132, an instruction buffer 133, process buffers 134, and an inter-rank (IR) bus and process buffer interface 136. The data buffers 132 are configured to receive and temporarily store data to be analyzed. In one embodiment, there are two data buffers 132 (data buffer A and data buffer B). Data may be stored in one of the two data buffers 132, while data is being emptied from the other data buffer 132, for analysis by the FSM lattice 30. The bus interface 130 may be configured to provide data to be analyzed to the data buffers 132 until the data buffers 132 are full. After the data buffers 132 are full, the bus interface 130 may be configured to be free to be used for other purposes (e.g., to provide other data from a data stream until the data buffers 132 are available to receive additional data to be analyzed). In the illustrated embodiment, the data buffers 132 may be 32 KBytes each, while in other embodiments, the data buffers 132 may be any suitable size (e.g., 4 KBytes, 8 KBytes, 16 KBytes, 64 KBytes, etc.). The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the use of multiple devices in a rank of devices. The multiple devices in the rank of devices share data such that all of the multiple devices receive all of the shared data in the correct order. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include an 8 bit data bus.

In the illustrated embodiment, the state machine engine 14 also includes a de-compressor 138 and a compressor 140 to aid in providing data to and from the state machine engine 14. As may be appreciated, the compressor 140 and de-compressor 138 may use the same compression algorithms to simplify software and/or hardware designs; however, the compressor 140 and the de-compressor 138 may also use different algorithms. By compressing the data, the bus interface 130 (e.g., DDR3 bus interface) utilization time may be minimized. In the present embodiment, the compressor 140 may be used to compress state vector data, configuration data (e.g., programming data), and match results data obtained after analysis by the FSM lattice 30. In one embodiment, the compressor 140 and de-compressor 138 may be disabled (e.g., turned off) such that data flowing to and/or from the compressor 140 and de-compressor 138 is not modified (e.g., neither compressed nor de-compressed).

The compressor 140 and de-compressor 138 can also be configured to handle multiple sets of data and each set of data may be of varying lengths. By "padding" compressed data and including an indicator as to when each compressed region ends, the compressor 140 may improve the overall processing speed through the state machine engine 14.

The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30, to move state vectors onto or off of the state machine engine 14, and to provide a state vector to the FSM lattice 30 to restore the FSM lattice 30 to a state corresponding to the provided state vector. For example, each state vector may be temporarily stored in the state vector cache memory 142. That is, the state of each SME 34, 36 may be stored, such that the state may be restored and used in further analysis at a later time, while freeing the SMEs 34, 36 for analysis of a new data set (e.g., search term). Like a typical cache, the state vector cache memory 142 allows storage of state vectors for quick retrieval and use, here by the FSM lattice 30, for instance. In the illustrated embodiment, the state vector cache memory 142 may store up to 512 state vectors. Each state vector comprises the state (e.g., activated or not activated) of the SMEs 34, 36 of the FSM lattice 30 and the dynamic (e.g., current) count of the counters 58.

As will be appreciated, the state vector data may be exchanged between different state machine engines 14 (e.g., chips) in a rank. The state vector data may be exchanged between the different state machine engines 14 for various purposes such as: to synchronize the state of the SMEs 34, 36 of the FSM lattices 30 and the dynamic count of the counters 58, to perform the same functions across multiple state machine engines 14, to reproduce results across multiple state machine engines 14, to cascade results across multiple state machine engines 14, to store a history of states of the SMEs 34, 36 and the dynamic count of the counters 58 used to analyze data that is cascaded through multiple state machine engines 14, and so forth. Furthermore, it should be noted that within a state machine engine 14, the state vector data may be used to quickly restore the state vector. For example, the state vector data may be used to restore the state of the SMEs 34, 36 and the dynamic count of the counters 58 to an initialized state (e.g., to search for a new search term), to restore the state of the SMEs 34, 36 and the dynamic count of the counters 58 to prior state (e.g., to search for a previously searched search term), and to change the state of the SMEs 34, 36 and the dynamic count of the counters 58 to be configured for a cascading configuration (e.g., to search for a search term in a cascading search). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for restoring the FSM lattice 30 (e.g., resetting, initializing). Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, match results may be stored in a match results memory 150. For example, a "match vector" indicating a match (e.g., detection of a pattern of interest) may be stored in the match results memory 150. The match result can then be sent to a match buffer 152 for transmission over the bus interface 130 to the processor 12, for example. As previously described, the match results may be compressed.

Additional registers and buffers may be provided in the state machine engine 14, as well. For instance, the state machine engine 14 may include control and status registers 154. In addition, restore and program buffers 156 may be provided for use in configuring the SMEs 34, 36 of the FSM lattice 30 initially, or restoring the state of the SMEs 34, 36 in the FSM lattice 30 during analysis. Similarly, save and repair map buffers 158 may also be provided for storage of save and repair maps for setup and usage.

Figure 10:
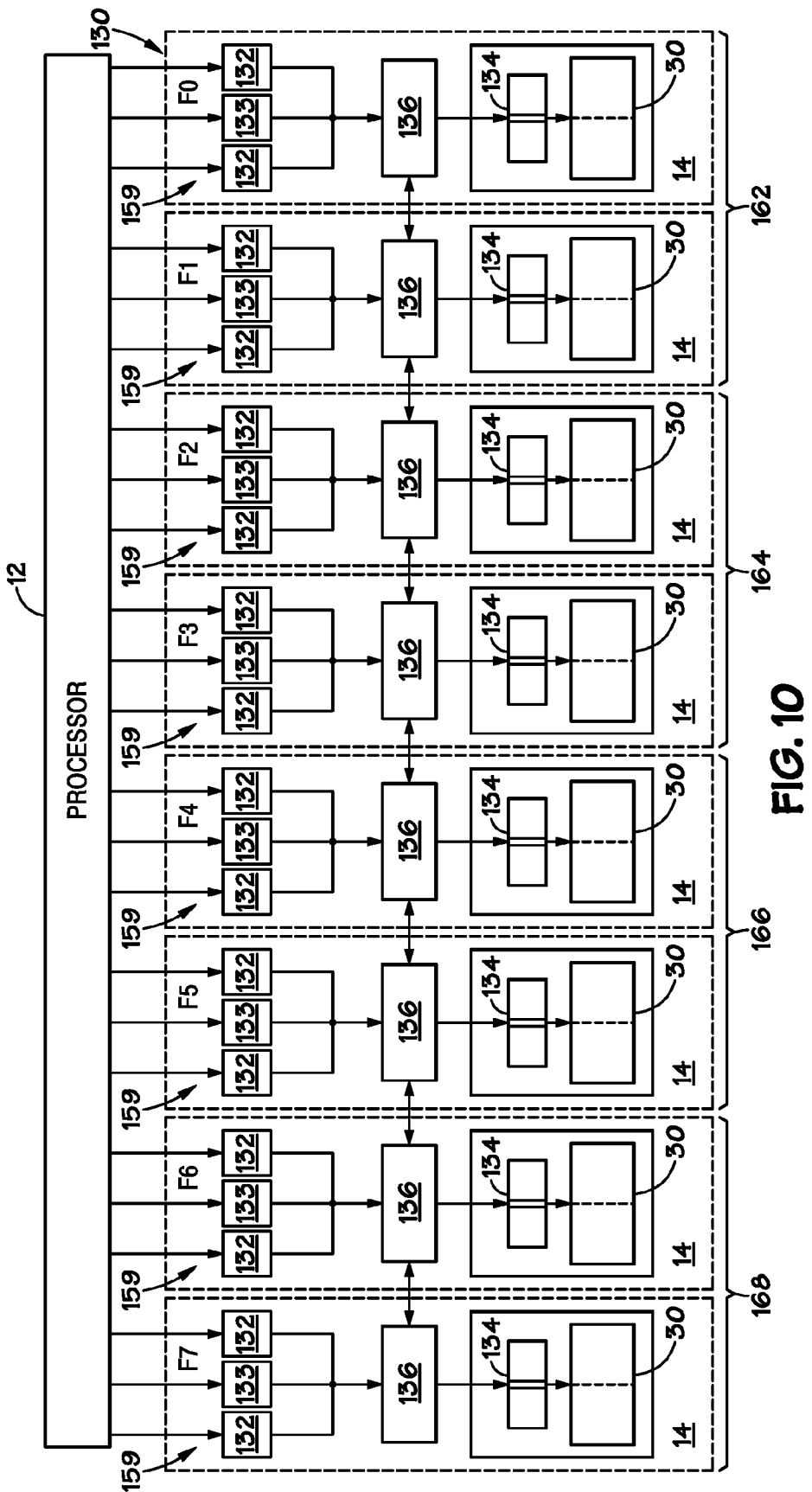
FIG. 10 illustrates an example of multiple physical state machine engines arranged in a rank of devices, according to various embodiments of the invention.

FIG. 10 illustrates an example of multiple physical state machine engines 14 arranged in a rank of devices. As may be appreciated, the interface (e.g., DDR3 bus interface 130) between the state machine engines 14 and the processor 12 may enable the state machine engines 14 to receive data from the processor 12 using all of the data lines from the processor 12. For example, if the processor 12 has 64 data lines and each state machine engine 14 has eight data lines, eight state machine engines 14 may be coupled to the 64 data lines to receive data from all of the data lines of the processor 12. Accordingly, the processor 12 may provide data to the state machine engines 14 quickly and using a standard interface. Moreover, the state machine engines 14 may be configured to coordinate together such that all of the data received collectively by the state machine engines 14 is provided to all of the state machine engines 14 in an orderly manner.

As previously described, data to be analyzed is received at the bus interface 130. The bus interface 130 directs the data to a data buffer system 159 of each state machine engine 14 (e.g., F0, F1, F2, F3, F4, F5, F6, F7) which includes the data buffers 132 and the instruction buffer 133. The data buffers 132 are configured to receive and temporarily store data to be analyzed. In the illustrated embodiment, there are two data buffers 132 (e.g., data buffer A and data buffer B) in each state machine engine 14. Data may be stored in one of the two data buffers 132, while data is being emptied from the other data buffer 132, for analysis by an FSM lattice 30. As previously discussed, the instruction buffer 133 is configured to receive instructions from the processor 12 via the bus interface 130, such as instructions that correspond to the data to be analyzed. From the data buffer system 159, data to be analyzed and instructions that correspond to the data are provided to one or more of the FSM lattices 30 via the IR bus and process buffer interface 136. In the present embodiment, the physical FSM lattices 30 are arranged into logical groups. Specifically, the FSM lattices 30 of the state machine engines 14 F0 and F1 are arranged into a logical group A 162, the FSM lattices 30 of the state machine engines 14 F2 and F3 are arranged into a logical group B 164, the FSM lattices 30 of the state machine engines 14 F4 and F5 are arranged into a logical group C 166, and the FSM lattices 30 of the state machine engines 14 F6 and F7 are arranged into a logical group D 168. In other embodiments, the physical FSM lattices 30 may be arranged into any suitable number of logical groups (e.g., 1, 2, 3, 4, 5, 6, 7, 8). Furthermore, as will be appreciated, data may be exchanged between the state machine engines 14 via the IR bus and process buffer interface 136. For example, the IR bus and process buffer interface 136 may be used to exchange data between any of the state machine engines 14 (e.g., F0, F1, F2, F3, F4, F5, F6, F7). Although eight state machine engines 14 are illustrated, the rank of devices may have any suitable number of state machine engines 14 (e.g., 1, 2, 4, 8, and so forth). As will be appreciated, the IR bus and process buffer interface 136 of each state machine engine 14 may include inputs for receiving data (e.g., from its own data buffer system 159 and from the IR bus and process buffer interface 136 of other state machine engines 14). Likewise, the IR bus and process buffer interface 136 of each state machine engine 14 may include outputs for sending data (e.g., to the FSM lattices 30 and to the IR bus and process buffer interfaces 136 of other state machine engines 14).

The bus interface 130 may receive data to be analyzed in a format that is tailored for efficient use of the data. Specifically, FIGS. 11 to 14 illustrate examples of how data may be assigned (e.g., grouped) by the processor 12 into data blocks that are provided to the state machine engines 14 via the bus interface 130.

Referring now to FIG. 11, an example of data segments (e.g., data sets, search terms) assigned by the processor 12 into data blocks to be provided to the state machine engines 14 is illustrated. In the present embodiment, multiple data segments are assigned into a single data block. Each data block is assigned to be analyzed by a single logical group (e.g., 162, 164, 166, 168) of FSM lattices 30 (e.g., on one or more state machine engines 14 in a rank of state machine engines 14). For example, a data stream 170 (e.g., a large amount of data to be sent by the processor 12 to the state machine engines 14) is assigned by the processor 12 into: a first data block 172 that corresponds to data intended for the logical group A 162, a second data block 174 that corresponds to data intended for the logical group B 164, a third data block 176 that corresponds to data intended for the logical group C 166, and a fourth data block 178 that corresponds to data intended for the logical group D 168. Specifically, the data stream 170 is assembled by the processor 12 from data segments 180, 182, 184, 186, 188, 190, 192, 194, 196, 198, and 200. As will be appreciated, each of the data segments 180, 182, 184, 186, 188, 190, 192, 194, 196, 198, and 200 may represent a data set to be analyzed by an FSM lattice 30. As will be appreciated, the processor 12 may assign data segments 180, 182, 184, 186, 188, 190, 192, 194, 196, 198, and 200 to the data blocks 172, 174, 176, and 178 for any suitable reason. For example, the processor 12 may assign data segments to certain data blocks based on a length of each data set and/or an order that data sets are to be analyzed in order to process the data sets efficiently.

The data segments 180, 182, 184, 186, 188, 190, 192, 194, 196, 198, and 200 may be assigned into the data blocks 172, 174, 176, and 178 using any suitable manner. For example, the data segments 180, 182, 184, 186, 188, 190, 192, 194, 196, 198, and 200 may be assigned into data blocks 172, 174, 176, and 178 such that a number of bytes in the data blocks 172, 174, 176, and 178 is minimized. As another example, the data segments 180, 182, 184, 186, 188, 190, 192, 194, 196, 198, and 200 may be assigned into data blocks 172, 174, 176, and 178 such that certain data segments are grouped together.

As illustrated, the first data block 172 includes the data segment A 180, the data segment F 190, and the data segment I 196. The second data block 174 includes the data segment B 182 and the data segment K 200. Furthermore, the third data block 176 includes the data segment C 184, the data segment E 188, and the data segment G 192. The fourth data block 178 includes the data segment D 186, the data segment H 194, and the data segment J 198.

As will be appreciated, to process the data blocks efficiently, the data blocks may all have an equal amount of data. Furthermore, the data segments within the data blocks may start and/or stop at predetermined intervals (e.g., bytes, words) within the data blocks so that processing devices can determine when data segments start and stop. However, the data segments may not have the correct amount of data to start and/or stop at the predetermined intervals. Accordingly, data padding may be inserted between certain data segments so that data starts and/or stops within the data blocks at the predetermined intervals. In addition, data padding may be added to the end of a data block so that all data blocks have an equal amount of data.

Referring now to FIG. 12, an example of data padding inserted between the data segments of the data blocks 172, 174, 176, and 178 of FIG. 11 is illustrated. For example, in the first data block 172, data padding 202 may be inserted between the data segment A 180 and the data segment F 190. Further, data padding 204 may be inserted between the data segment F 190 and the data segment I 196. As another example, in the second data block 174, data padding 206 may be inserted between the data segment B 182 and the data segment K 200. In the third data block 176, data padding 208 may be inserted between the data segment C 184 and the data segment E 188. Likewise, data padding 210 may be inserted between the data segment E 188 and the data segment G 192. As another example, in the fourth data block 178, data padding 212 may be inserted between the data segment D 186 and the data segment H 194. In addition, data padding 214 may be inserted between the data segment H 194 and the data segment J 198.

The data padding 202, 204, 206, 208, 210, 212, and 214 may include any suitable number of bytes of data that are not to be analyzed (e.g., invalid data, junk data, filler data, garbage data, etc.). In one embodiment, the number of bytes used as data padding may be a number of bytes that when added to a number of bytes of the prior data segment reach a whole word boundary (i.e., a number of bytes of the prior data segment plus the number of bytes used as data padding is equally divisible by the whole word boundary). For example, a number of bytes of the data padding 202 may be such that the combined number of bytes of the data padding 202 and the data segment A 180 (i.e., the prior data segment) is equally divisible (e.g., no remainder) by the whole word boundary. In the illustrated embodiment, the whole word boundary may be eight bytes. In other embodiments, the whole word boundary may be any suitable number of bytes or bits. As such, in the illustrated embodiment, if the data segment A 180 were to include 63 bytes of data, the data padding 202 would include one byte of data (e.g., to make 64 combined bytes of data between the data segment A 180 and the data padding 202, with 64 being equally divisible by eight bytes). As another example, if the data segment A 180 included 60 bytes of data (e.g., which is not equally divisible by eight), the data padding 202 would include four bytes of data. As a further example, if the data segment A 180 included 64 bytes of data, the data padding 202 would include zero bytes of data, or in other words the data padding 202 would not be needed between the data segment A 180 and the data segment F 190. As will be appreciated, each data padding 202, 204, 206, 208, 210, 212, and 214 may operate in a similar manner.

Figure 13:
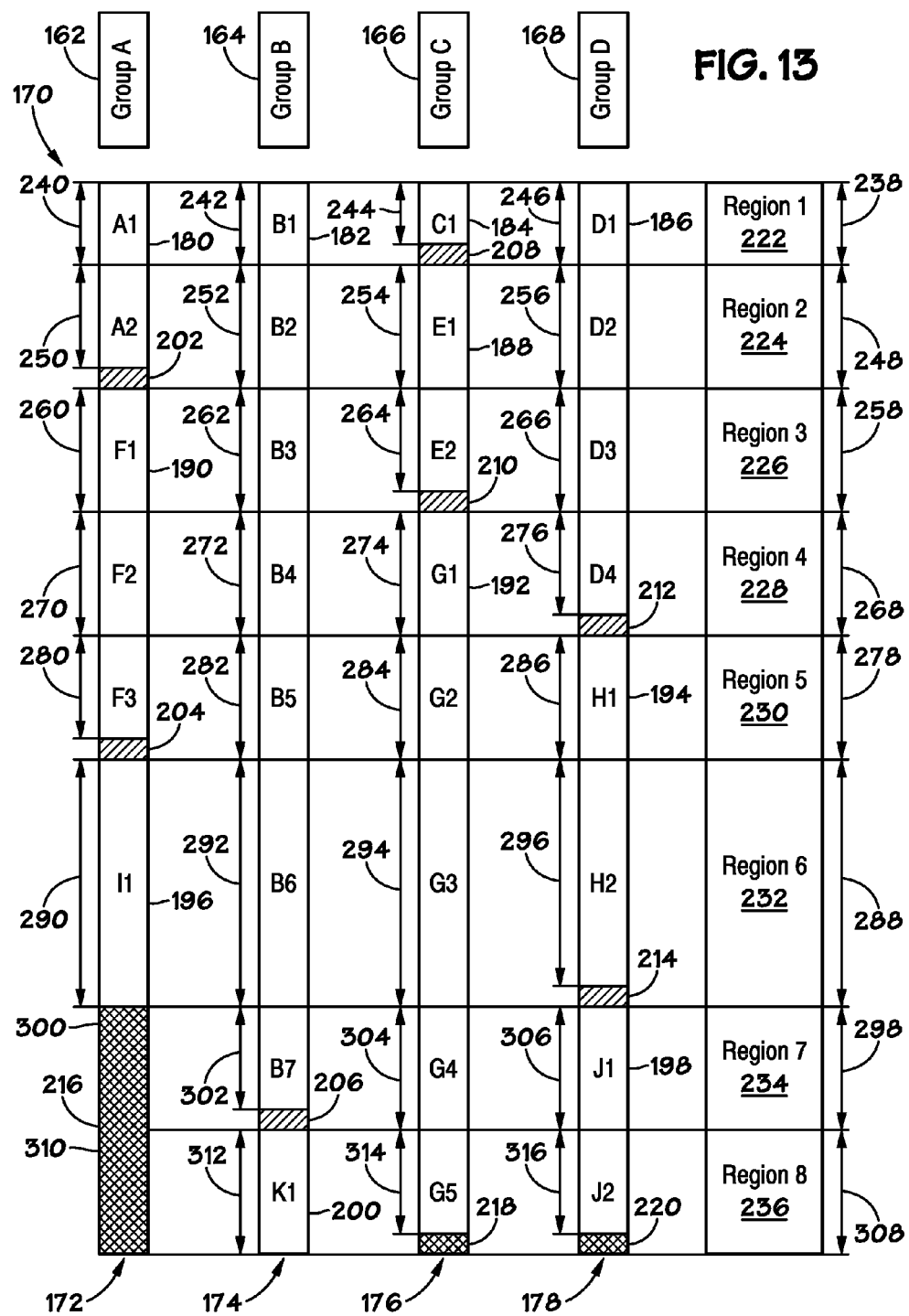
FIG. 13 illustrates an example of data padding inserted after data segments of the data blocks of FIG. 12, according to various embodiments of the invention

Referring now to FIG. 13, an example of data padding inserted after data segments of the data blocks 172, 174, 176, and 178 of FIG. 12 is illustrated. Specifically, data padding may be inserted at the end of each data block 172, 174, 176, and 178 as needed to make the number of bytes in each data blocks 172, 174, 176, and 178 equal. Furthermore, the data padding at the end of each data block 172, 174, 176, and 178 may be used so that each data block 172, 174, 176, and 178 reaches a whole word boundary as previously described. In the illustrated embodiment, data padding 216 is inserted after the data segment I 196, data padding 218 is inserted after the data segment G 192, and data padding 220 is inserted after the data segment J 198. Accordingly, each of the data blocks 172, 174, 176, and 178 includes an equal number of bytes and each of the data blocks 172, 174, 176, and 178 reaches a whole word boundary.

It may be difficult for FSM lattices 30 to distinguish data padding from valid data. Accordingly, instructions may accompany the data blocks 172, 174, 176, and 178 so that data padding may be identified and disregarded by the FSM lattices 30 during analysis of the valid data. Such instructions may be sent to the state machine engine 14 by the processor 12 via the bus interface 130 and may be received, stored, and provided by the instruction buffer 160 of the state machine engine 14. To produce the instructions, the processor 12 may logically divide the data stream 170 into regions 222, 224, 226, 228, 230, 232, 234, and 236. The end boundaries of the regions 222, 224, 226, 228, 230, 232, 234, and 236 may be formed such that each region ends when any data padding ends. For example, the first region 222 ends when the data padding 208 ends. As another example, the fifth region 230 ends when the data padding 204 ends.

The instructions that accompany the data blocks 172, 174, 176, and 178 may include a number of total bytes for each region 222, 224, 226, 228, 230, 232, 234, and 236 and a number of valid bytes (e.g., the number of bytes excluding byte padding) for each data block 172, 174, 176, and 178 within each region. For example, the instructions may include: a number of bytes 238 that corresponds to the first region 222, a number of bytes 240 that corresponds to the valid bytes for the first data block 172 within the first region 222, a number of bytes 242 that corresponds to the valid bytes for the second data block 174 within the first region 222, a number of bytes 244 that corresponds to the valid bytes for the third data block 176 within the first region 222, and a number of bytes 246 that corresponds to the valid bytes for the fourth data block 178 within the first region 222. Note that, in this example, the number of bytes represented by 238, 240, 242, and 246 are equal because there is no padding following data segments A1, B1, and D1.

Likewise, the instructions may include: numbers of bytes 248, 250, 252, 254, and 256 that correspond to the second region 224, numbers of bytes 258, 260, 262, 264, and 266 that correspond to the third region 226, numbers of bytes 268, 270, 272, 274, and 276 that correspond to the fourth region 228, numbers of bytes 278, 280, 282, 284, and 286 that correspond to the fifth region 230, numbers of bytes 288, 290, 292, 294, and 296 that correspond to the sixth region 232, numbers of bytes 298, 300, 302, 304, and 306 that correspond to the seventh region 234, and numbers of bytes 308, 310, 312, 314, and 316 that correspond to the eighth region 236. It should be noted that the instructions may include a number of valid bytes for each data segment in each region 222, 224, 226, 228, 230, 232, 234, 236. Therefore, for the seventh region 234, the logical group A 162 may include a number of valid bytes 300 of zero. Furthermore, for the eighth region 236, the logical group A 162 may include a number of valid bytes 310 of zero. Accordingly, using the instructions, the FSM lattices 30 may identify the data padding inserted with the data segments. Although one specific type of instructions has been presented herein, it should be noted that the instructions included with the group of data blocks 172, 174, 176, and 178 may be any suitable group of instructions that allow the FSM lattices 30 to distinguish valid data from data padding (i.e., invalid data).

Figure 14:
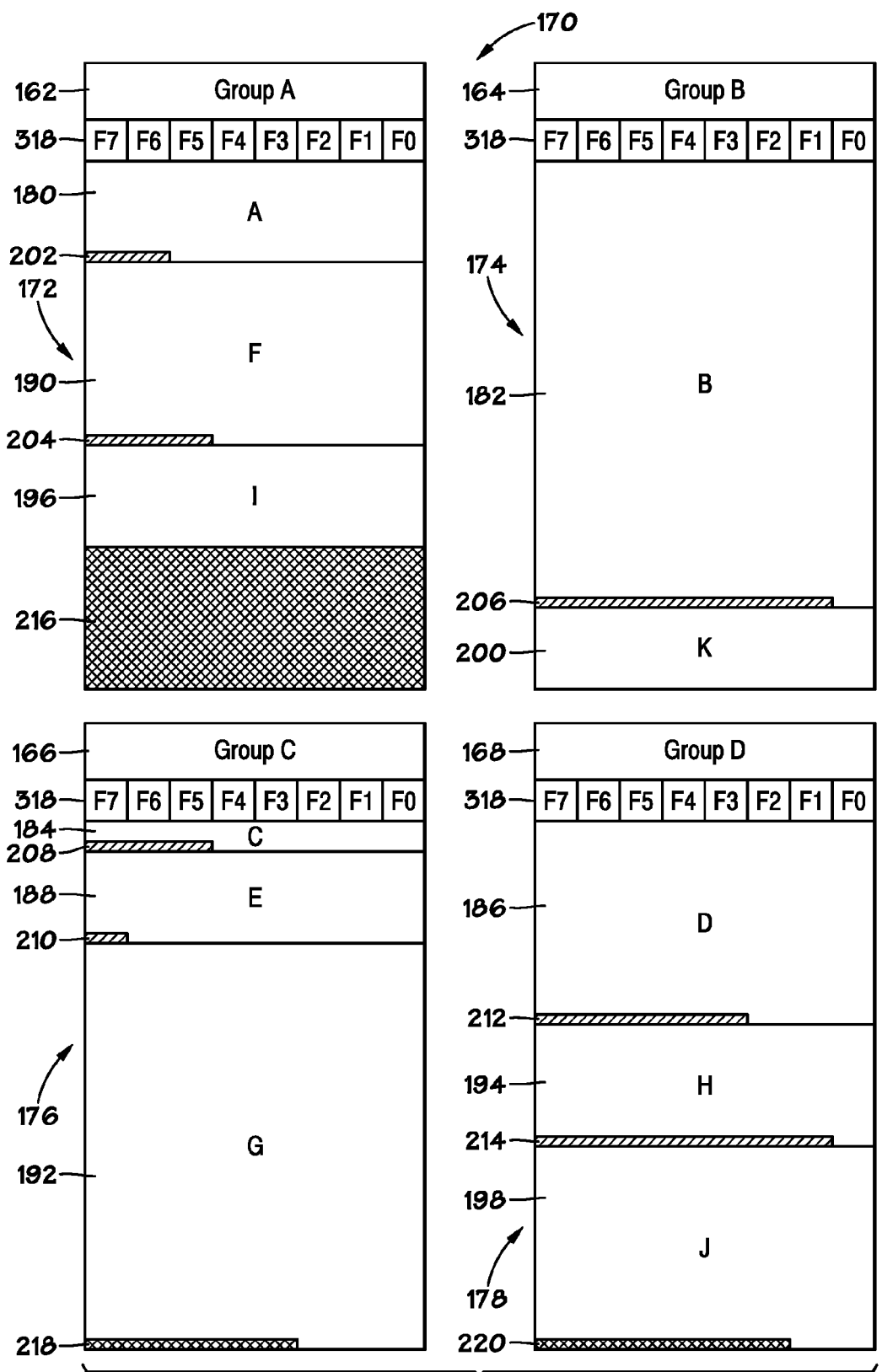
FIG. 14 illustrates an example of the data blocks of FIG. 13 organized for transmission to a data buffer system of state machine engines, according to various embodiments of the invention.

Referring now to FIG. 14, an example of the data blocks 172, 174, 176, and 178 of FIG. 13 organized by the processor 12 for transmission to data buffer systems 159 of the state machine engines 14 is illustrated. Each of the data blocks 172, 174, 176, and 178 are arranged with rows of data having a number of bytes 318 equivalent to a whole word length. In the illustrated embodiment, the whole word length is eight bytes represented by a byte for each of state machine engines 14 (e.g., F0, F1, F2, F3, F4, F5, F6, and F7). The first byte from each of the data segments begins at the right side of each data block 172, 174, 176, and 178 and increase toward the left side of each data block such that the first byte for the data segment A 180 is in column F0 and the eighth byte for the data segment A 180 is in column F7. As will be appreciated, the column F0 represents data that will be initially stored in the data buffers 132 of the F0 state machine engine 14, the column F1 represents data that will be initially stored in the data buffers 132 of the F1 state machine engine 14, and so forth. Furthermore, the data segments are placed in rows from top to bottom. As illustrated, each combination of a data segment and data padding ends in column F7 (i.e., they each extend for a whole word length). Furthermore, each data block 172, 174, 176, and 178 is equal in size. As will be appreciated, during operation the data blocks 172, 174, 176, and 178 may be provided from the processor 12 to the state machine engines 14 sequentially.

The data of a given block (172, 174, 176, and 178) is provided to and stored across the data buffer systems 159 of all of the state machine engines 14 in a rank of devices such that the data intended for the corresponding logical group (162, 164, 166, or 168, respectively) is spread across the data buffer systems 159 of the state machine engines 14 of the rank. The data may be received and stored in this manner to enable data to be quickly provided over the bus interface 130 to the data buffer systems 159. In certain embodiments, the data buffers 132 of the data buffer systems 159 may be configured to latch data from the bus interface 130 (e.g., at predetermined intervals). In other embodiments, the data buffers 132 of the data buffer systems 159 may receive a limited portion of data based on the connection between the data buffers 132 and the bus interface 130. As explained in detail below, the data stored in the data buffer systems 159 is sorted out when the data is provided from the data buffer systems 159 to the process buffers 134 via the IR bus and process buffer interface 136.

Figure 15:
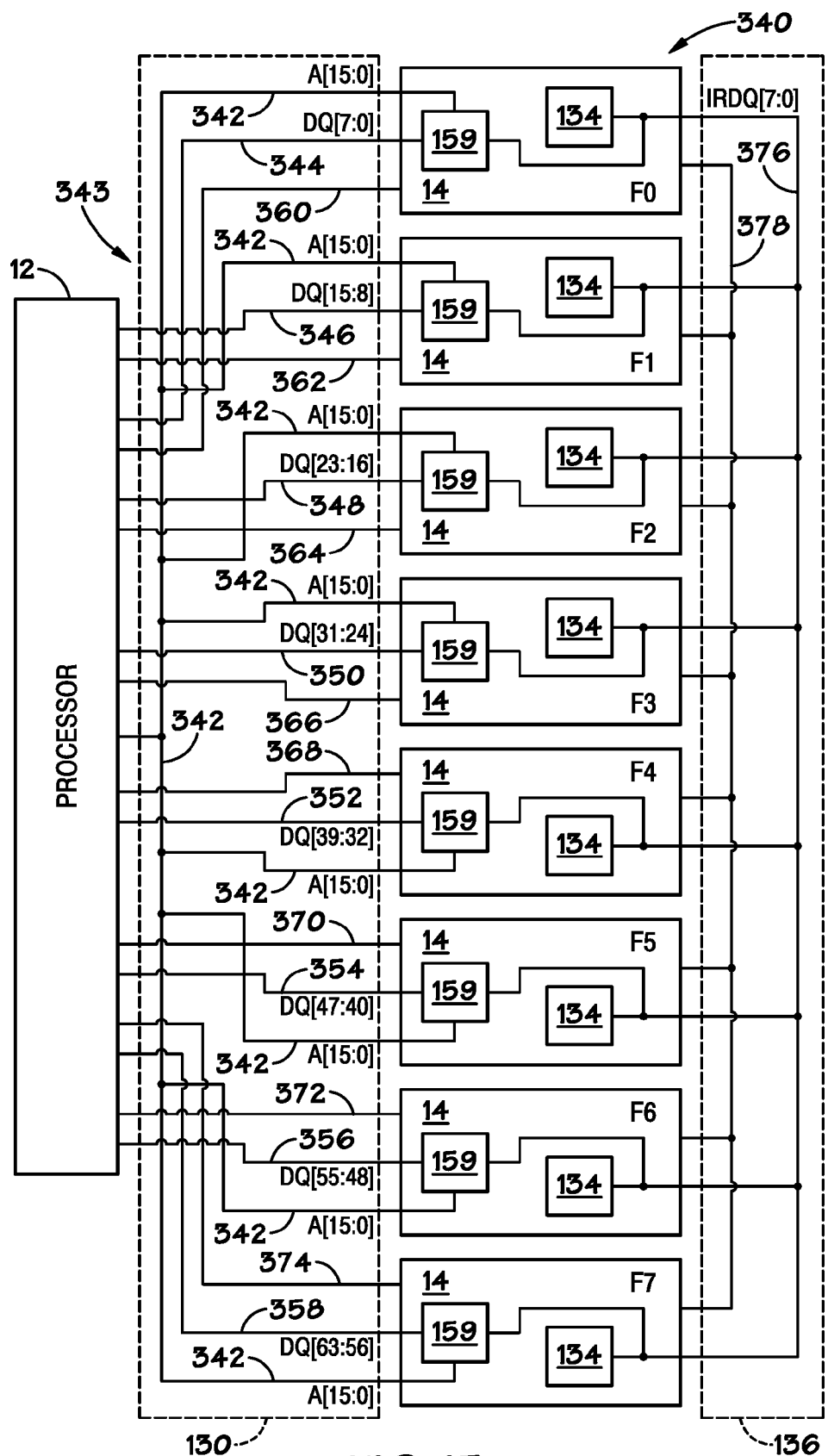
FIG. 15 illustrates an example of multiple physical state machine engines arranged in a rank of devices and coupled together by an inter-rank (IR) bus and process buffer interface, according to various embodiments of the invention.

FIG. 15 illustrates an example of multiple physical state machine engines 14 arranged in a rank of devices and coupled together by the IR bus and process buffer interface 136. Specifically, in the illustrated embodiment, eight state machine engines 14 (F0, F1, F2, F3, F4, F5, F6, and F7) are arranged on a single printed circuit board to form a module 340. In certain embodiments, the module 340 may be arranged similarly to a dual in-line memory module (DIMM). For example, a single chip may include one state machine engine 14. Furthermore, multiple chips each having one state machine engine 14 may be coupled (e.g., electrically, optically, or otherwise operably coupled) to the printed circuit board of the module 340. For example, the printed circuit board may include 1, 2, 4, 8, 16, or more chips that each include one state machine engine 14. Moreover, in certain embodiments, the module 340 may include 72, 100, 144, 168, 184, 200, 240, or fewer or more pins or connecting elements for coupling the module 340 to a system, such as a computer, workstation, or server. For example, the module 340 may include 240 pins and may be configured to be inserted into a slot in a server.

The pins of the module 340 are coupled to the DDR3 bus interface 130 to facilitate data transfer between the processor 12 and the module 340. Moreover, the pins of the module 340 are coupled to pins of the chips (e.g., F0, F1, F2, F3, F4, F5, F6, and F7) having the state machine engines 14 using routing lines of the printed circuit board. The DDR3 bus interface 130 includes a DDR3 address bus 342 to enable the processor 12 to select a memory address of the data buffer system 159 of each state machine engine 14. As illustrated, the DDR3 address bus 342 includes 16 address lines; however, in other embodiments, the DDR3 address bus 342 may include fewer or more than 16 address lines. Each address line of the DDR3 address bus 342 is coupled to the data buffer system 159 of each state machine engine 14. Accordingly, the processor 12 may select an address of the data buffer system 159 of each state machine engine 14 together.

As may be appreciated, the DDR3 bus interface 130 between the state machine engines 14 and the processor 12 may enable the state machine engines 14 to receive data from the processor 12 using all of the data lines from the processor 12. For example, if the processor 12 has 64 data lines and each state machine engine 14 has eight data lines, eight state machine engines 14 may be coupled to the 64 data lines to receive data from all of the data lines of the processor 12. Accordingly, the processor 12 may provide data to the state machine engines 14 quickly and using a standard interface. Moreover, the state machine engines 14 may be configured to coordinate together such that all of the data received collectively by the state machine engines 14 is provided to all of the state machine engines 14 in an orderly manner. In the illustrated embodiment, the DDR3 bus interface 130 includes a data bus 343 having sets of data lines 344, 346, 348, 350, 352, 354, 356, and 358 coupled to each state machine engine 14. As illustrated, separate data lines are coupled to each state machine engine 14. For example, in certain embodiments, the data bus 343 includes 64 data lines and the module 340 includes eight state machine engines 14. In such an embodiment, eight data lines may be coupled and/or solely dedicated to each of the eight state machine engines 14. Accordingly, using the data bus 343 and the DDR3 address bus 342, a respective byte of data may be synchronously provided to a selected address of the data buffer system 159 of each state machine engine 14. In certain embodiments, fewer or more than eight data lines may couple the state machine engines 14 to the data bus 343. Furthermore, the DDR3 bus interface 130 may include fewer or more than 64 data lines. The following table, TABLE 1, illustrates various examples of configurations of DDR3 bus interfaces 130 having a specified number of data lines, and a number of data lines of the DDR3 bus interfaces 130 that are coupled to the state machine engines 14.

TABLE 1

| State Machine Engine 14 | DDR3 Bus Interface 130 Data Bus 343 Width | | | |
|---|---|---|---|---|
| Input Data Bus Width | x 8 | x 16 | x 32 | x 64 |
| x 8 | 1 state machine engine 14 | 2 state machine engines 14 | 4 state machine engines 14 | 8 state machine engine 14 |
| x 16 | N/A | 1 state machine engine 14 | 2 state machine engines 14 | 4 state machine engines 14 |

As illustrated in TABLE 1, if the data bus 343 includes eight data lines, the eight data lines may be coupled to one state machine engine 14 having an input data bus width of eight lines. As another example, if the data bus 343 includes 16 data lines, the 16 data lines may be coupled to two state machine engines 14 having an input data bus width of eight lines, or one state machine engine 14 having an input data bus width of 16 lines. As a further example, if the data bus 343 includes 32 data lines, the 32 data lines may be coupled to four state machine engines 14 having an input data bus width of eight lines, or two state machine engine 14 having an input data bus width of 16 lines. Moreover, if the data bus 343 includes 64 data lines, the 64 data lines may be coupled to eight state machine engines 14 having an input data bus width of eight lines, or four state machine engine 14 having an input data bus width of 16 lines.

The DDR3 bus interface 130 includes other control lines 360, 362, 364, 366, 368, 370, 372, and 374 that facilitate data transfer between the processor 12 and the module 340. The other control lines 360, 362, 364, 366, 368, 370, 372, and 374 may enable individual communication between the processor 12 and a selected state machine engine 14 and/or may enable communication between the processor 12 and the state machine engines 14 collectively.

During operation, the processor 12 may provide data to the DDR3 bus interface 130. For example, the processor 12 may provide 64 bits of data at a time using a data bus having 64 data lines. Furthermore, the state machine engines 14 may each receive eight bits of data from eight data lines coupled to each state machine engine 14. Accordingly, the processor 12 may provide 64 bits of data at a time to the module 340. As discussed previously, the state machine engines 14 may be configured to receive data to be analyzed by other different state machine engines 14. As such, the processor 12 may provide data to the module 340 in data blocks, with each data block intended to be processed by one or more of the state machine engines 14 of the module 340. In other words, the processor 12 may not sort and/or pack the data blocks it provides. For example, the processor 12 may provide a number of consecutive bytes of data intended to be analyzed by the state machine engine 14 F0, even though portions of the number of consecutive bytes of data will be received and stored by each of the state machine engines 14 (F0, F1, F2, F3, F4, F5, F6, and F7). Thus, the processor 12 may provide the data to the module 340 in a simplified and efficient manner, and may enable the state machine engines 14 to sort the data to be processed by selected state machine engines 14.

The processor 12 may also provide instructions to the state machine engines 14 to instruct the state machine engines 14 that are to analyze each data block provided from the processor 12, may provide instruction to the state machine engines 14 to analyze data for a period of time (e.g., predetermined period of time), and may provide instructions to the state machine engines 14 to instruct the state machine engines 14 concerning a length of each data block provided from the processor 12. In certain embodiments, the data buffer system 159 may include certain memory locations to store instructions received from the processor 12. Accordingly, the processor 12 may select, using the DDR3 address bus 342, a predetermined address of the data buffer system 159 that is dedicated to receiving instructions. The processor 12 may then provide instructions to each of the state machine engines 14 using the data bus 343 and the DDR3 address bus 342.

The IR bus and process buffer interface 136 is part of the module 340 and includes connections (e.g., electrical, optical, or another operable connection) that interconnect the state machine engines 14. As illustrated, the IR bus and process buffer interface 136 includes an IR data bus 376 and other control lines 378 that may be part of an instruction bus. In the illustrated embodiment, the IR data bus 376 includes eight data lines that couple each of the state machine engines 14 to one another. Specifically, the IR data bus 376 couples together the data buffer system 159 of each state machine engine 14, and the process buffers 134 of each state machine engine 14. Moreover, the IR data bus 376 may be used to provide data received from the processor 12 to other state machine engines 14 for analysis of the data. The other control lines 378 may be used to synchronize and/or control data transfer between the state machine engines 14.

Each chip having a state machine engine 14 may be grouped into a logical group to process data received from the processor 12. As may be appreciated, the state machine engines 14 of the module 340 may include one or more logical groups. In the module 340, there may be one logical group that includes all of the state machine engines 14 (F0, F1, F2, F3, F4, F5, F6, and F7). Furthermore, there may be two, three, four, five, six, seven, or eight logical groups. The logical groups may have any number of state machine engines 14, and the logical groups do not have to be the same size. For example, in one embodiment, a first logical group may include state machine engines 14 F0 and F1, and a second logical group may include state machine engines 14 F2, F3, F4, F5, F6, and F7. By using logical groups that may include more than one state machine engine 14, a single automata processor block that is too large to be programmed into a single state machine engine 14 may be analyzed by the logical group. Furthermore, logical groups enable multiple data blocks to be analyzed concurrently by distinct logical groups. Moreover, logical groups enable data to be analyzed at high throughput speeds, such as by using logical groups having the same size and/or by parallel processing. Thus, the architecture of the module 340 provides flexibility and may enable a single state machine engine 14 of the module 340 to process data at rates up to 1.0 Gbps or more. Furthermore, the architecture of the module 340 may enable the module 340 to process data in parallel in eight logical groups, such as by using eight state machine engines 14, thereby achieving data processing rates up to eight times the rate of a single state machine engine 14 (e.g., 8.0 Gbps or more).

Even though each state machine engine 14 may be part of a logical group, the state machine engines 14 may not receive any indication that they are part of a particular logical group and/or any indication about a number of state machine engines 14 that are part of its logical group. However, certain information may be provided to the state machine engines 14 using instructions and/or the other control lines 360, 362, 364, 366, 368, 370, 372, and 374. For example, the state machine engines 14 may receive and/or store an indication about a total bus width of the DDR3 bus interface 130, a number of data lines coupled to the DDR3 bus interface 130, a number of data lines of the IR data bus 376, a device position on the DDR3 bus interface 130, a device position on the IR data bus 376, whether the state machine engine 14 is a master device, whether the state machine engine 14 is a slave device, a number of IR data bus 376 cycles to perform, a number of bytes that will be received, and/or a number of bytes to be analyzed (e.g., valid data).

For example, during initialization of the module 340, the processor 12 may provide data to each state machine engine 14 to assign a number to each state machine engine 14 (e.g., 0, 1, 2, 3, 4, 5, 6, 7). In certain embodiments, the state machine engine 14 that receives a "0" may be state machine engine 14 F0 and may be the "master" device, and all other devices may be "slave" devices. In other embodiments, the "master" device may be assigned any suitable value. In certain embodiments, the "master" device may be configured to coordinate synchronization of the state machine engines 14. The processor 12 may also provide data to each state machine engine 14 to indicate a total number of state machine engines 14 that are part of the module 340, a logical group to which the state machine engine 14 belongs, and/or a number of logical groups that are part of the module 340.

In one embodiment with one logical group, the IR bus and process buffer interface 136 enables each state machine engine 14 in the rank (e.g., F0, F1, F2, F3, F4, F5, F6, and F7) to analyze all of the bytes of data provided by the processor 12. Accordingly, in such an embodiment, the entire data stream may be processed in each of the state machine engines 14. In another embodiment having multiple logical groups, the IR bus and process buffer interface 136 enables each state machine engine 14 in the rank to receive an assigned portion of the data stream in a timely manner by implementing a data-slicing scheme. For example, the processor 12 may provide data intended for each logical group sequentially, but the state machine engines 14 may store the data in an offset manner in the data buffer system 159 of each state machine engine 14 so that the data may be provided to the IR data bus 376 to efficiently provide the data to intended state machine engines 14.

Figure 16:
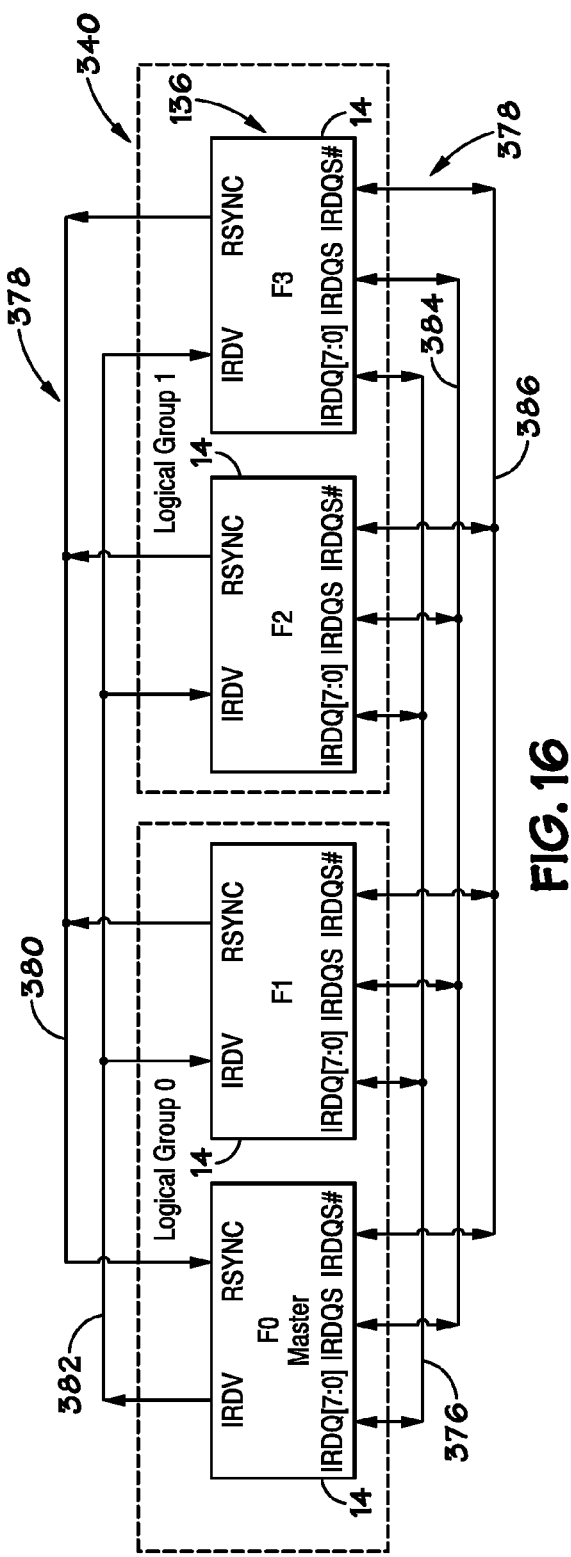
FIG. 16 illustrates an example of signals of an IR bus and process buffer interface coupled to multiple physical state machine engines, according to various embodiments of the invention.

FIG. 16 illustrates an example of the IR bus and process buffer interface 136 coupled to multiple physical state machine engines 14. Specifically, the illustrated embodiment includes four state machine engines 14 divided into two logical groups (i.e., logical group 0 and logical group 1). Furthermore, the four state machine engines 14 may be coupled to a DDR3 bus interface 130 having 32 data lines. As described above, the IR data bus 376 is coupled to each of the state machine engines 14. Furthermore, the other control lines 378 include a rank synchronization line (RSYNC) 380, an IR bus data valid line (IRDV) 382, a first IR bus data strobe line (IRDQS) 384, and a second IR bus data strobe line (IRDQS#) 386 that are coupled to each of the state machine engines 14. Each of the state machine engines 14 is configured to receive an input from and/or to control a signal of the RSYNC 380. For example, in one embodiment, "slave" devices and/or the "master" device may be configured to control the signal of the RSYNC 380 from a logic 1 to a logic 0 by pulling the RSYNC 380 to a logic 0, while the "master" device may be configured to control a signal of IRDV 382 based on an input received from the RSYNC 380. In the illustrated embodiment, the state machine engine 14 F0 is configured as the "master" device, while the state machine engines 14 F1, F2, and F3 are configured as "slave" devices. Furthermore, the state machine engines 14 F1, F2, and F3 are configured to control the signal of the RSYNC 380, while the state machine engine 14 F0 is configured to control a signal of IRDV 382 based on an input received from the RSYNC 380. The state machine engine 14 F0 may be configured to receive a first indication (e.g., logic high) indicating that the state machine engines 14 F1, F2, and F3 are all available to receive data. Moreover, the state machine engine 14 F0 may be configured to receive a second indication (e.g., logic low) indicating that at least one of the state machine engines 14 F1, F2, and F3 is not available to receive data. For example, any one of the state machine engines 14 F1, F2, and F3 may control a signal of the RSYNC 380 to a logic low (e.g., output a logic low) to indicate to the state machine engine 14 F0 that at least one of the state machine engines 14 F1, F2, and F3 is not available to receive data.

In addition, each of the state machine engines 14 is configured to receive an input from and/or to control a signal of the IRDV 382. For example, in one embodiment, the "master" device may be configured to control a signal of the IRDV 382, while the "slave" devices may be configured to receive an input from the IRDV 382. In the illustrated embodiment, the state machine engine 14 F0 is configured to control a signal of the IRDV 382, while the state machine engines 14 F1, F2, and F3 are configured to receive an input from the IRDV 382. The state machine engine 14 F0 may be configured to control the signal to a first indication (e.g., logic high) indicating that data provided to the state machine engines 14 F1, F2, and F3 is valid. Moreover, the state machine engine 14 F0 may be configured to control the signal to a second indication (e.g., logic low) indicating that data provided to the state machine engines 14 F1, F2, and F3 is not valid. Each of the state machine engines 14 is configured to receive an input from and to provide an output to the IRDQS 384 and the IRDQS# 386. Moreover, each of the state machine engines 14 is configured to output data to the IRDQS 384 and/or the IRDQS# 386 while providing data to the IR data bus 376.

Figure 17:
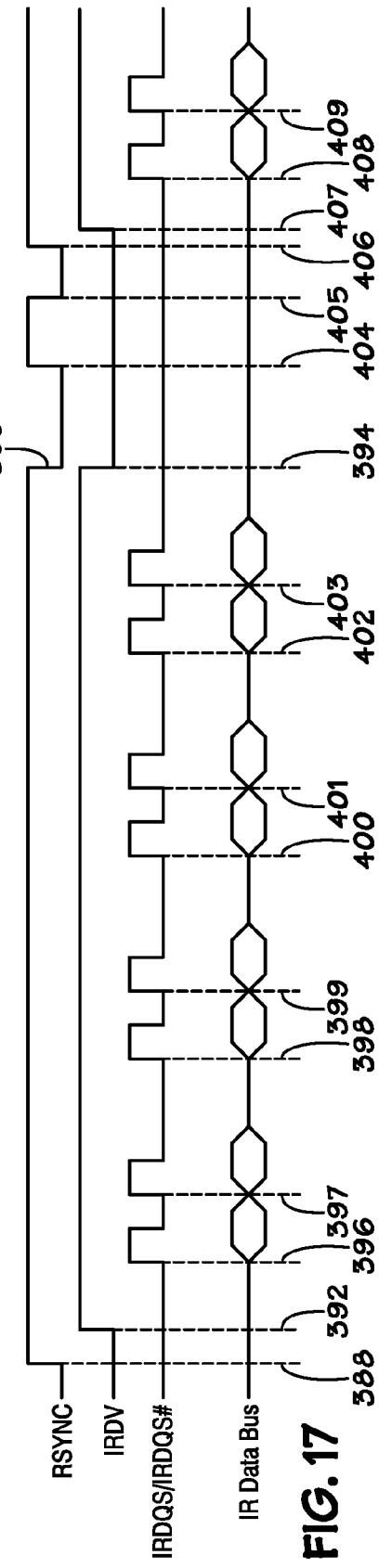
FIG. 17 illustrates an example of a timing diagram of signals of an IR bus and process buffer interface, according to various embodiments of the invention.

FIG. 17 illustrates an example of a timing diagram of signals of the IR bus and process buffer interface 136. In certain configurations, the RSYNC 380 may be used to synchronize the state machine engines 14. For example, each of the state machine engines 14 may include a default state in which the state machine engine 14 drives a signal of the RSYNC 380 to a logic low (e.g., "pulls" the RSYNC 380 to a logic low). The processor 12 may provide various instructions to the state machine engines 14 that initiate synchronization of the state machine engines 14. For example, instructions that initiate synchronization may include M_BAR, I_DA.PROCESS, I_DA.PROCESS_EoP, I_DA.PROCESS_EoD, I_DB.PROCESS, I_DB.PROCESS_EoP, and I_DB.PROCESS_EoD. When a state machine engine 14 encounters one of these instructions, the state machine engine 14 stops driving the signal of the RSYNC 380 to a logic low (e.g., "lets go" of the RSYNC 380) and pauses operation (e.g., does not continue executing instructions). The state machine engine 14 pauses operation until the RSYNC 380 transitions to a logic high (this occurs after all of the state machine engines 14 stop driving the signal of the RSYNC 380 to a logic low, or "let go" of the RSYNC 380) and/or the IRDV 382 transitions to a logic high. When the state machine engine 14 detects the RSYNC 380 and/or the IRDV 382 are a logic high, the state machine engine 14 resumes operation of the instruction that initiated synchronization. At the completion of the instruction that initiated synchronization, the state machine engine may return to its default state in which the state machine engine 14 drives the signal of the RSYNC 380 to a logic low (e.g., "pulls" the RSYNC 380 to a logic low).

One embodiment of signals exchanged during such an operation is illustrated in FIG. 17. For example, at a time 388, the RSYNC 380 transitions from a logic low to a logic high. Such a transition indicates that all of the state machine engines 14 F0, F1, F2, and F3 have received an instruction (e.g., from the processor 12) that initiates synchronization of the state machine engines 14, that all of the state machine engines 14 F0, F1, F2, and F3 have paused operation, and that all of the state machine engines 14 F0, F1, F2, and F3 have stopped driving the signal of the RSYNC 380 to a logic low. In this example, the state machine engines 14 F0, F1, F2, and F3 have encountered a data buffer processing instruction (e.g., I_DA.PROCESS, I_DA.PROCESS_EoP, I_DA.PROCESS_EoD, I_DB.PROCESS, I_DB.PROCESS_EoP, and I_DB.PROCESS_EoD). At a time 390, the RSYNC 380 transitions from a logic high to a logic low. Such a transition indicates that at least one of the state machine engines 14 F0, F1, F2, and F3 has completed the data buffer processing instruction, and that at least one of the state machine engines 14 F0, F1, F2, and F3 has pulled the RSYNC 380 to a logic low.

At a time 392, the IRDV 382 transitions from a logic low to a logic high. Such a transition is an indication from the "master" state machine engine 14 F0 to all of the state machine engines 14 F0, F1, F2, and F3 that valid data will begin to be provided to the IR data bus 376, starting with the "master" device and continuing through each state machine engine 14 in the rank in order (e.g., F0, F1, F2, F3). At a time 394, the IRDV 382 transitions from a logic high to a logic low. Such a transition is an indication from the "master" state machine engine 14 F0 to all of the state machine engines 14 F0, F1, F2, and F3 that valid data is no longer being provided to the IR data bus 376.

At a time 396, the "master" state machine engine 14 F0 provides data (e.g., a first byte of data intended for logical group 0) onto the IR data bus 376 and outputs a logic high onto the IRDQS 384 and/or the IRDQS# 386. Then, at a time 397, the "master" state machine engine 14 F0 provides data (e.g., a second byte of data intended for logical group 1) onto the IR data bus 376 and outputs a logic high onto the IRDQS 384 and/or the IRDQS# 386. Moreover, at a time 398, the state machine engine 14 F1 provides data (e.g., a first byte of data intended for logical group 0) onto the IR data bus 376 and outputs a logic high onto the IRDQS 384 and/or the IRDQS# 386. Then, at a time 399, the state machine engine 14 F1 provides data (e.g., a second byte of data intended for logical group 1) onto the IR data bus 376 and outputs a logic high onto the IRDQS 384 and/or the IRDQS# 386.

Furthermore, at a time 400, the state machine engine 14 F2 provides data (e.g., a first byte of data intended for logical group 0) onto the IR data bus 376 and outputs a logic high onto the IRDQS 384 and/or the IRDQS# 386. Then, at a time 401, the state machine engine 14 F2 provides data (e.g., a second byte of data intended for logical group 1) onto the IR data bus 376 and outputs a logic high onto the IRDQS 384 and/or the IRDQS# 386. In addition, at a time 402, the state machine engine 14 F3 provides data (e.g., a first byte of data intended for logical group 0) onto the IR data bus 376 and outputs a logic high onto the IRDQS 384 and/or the IRDQS# 386. Then, at a time 403, the state machine engine 14 F3 provides data (e.g., a second byte of data intended for logical group 1) onto the IR data bus 376 and outputs a logic high onto the IRDQS 384 and/or the IRDQS# 386.

Accordingly, each of the state machine engines 14 provides data having a "burst length" of two bytes of data (e.g., each state machine engine 14 outputs two bytes of data before the next state machine engine 14 in the rank provides data). In the illustrated embodiment, the first byte of data is intended for the first logical group (logical group 0) and the second byte of data is intended for the second logical group (logical group 1). As may be appreciated, the "burst length" may vary in other embodiments. For example, the "burst length" may be based on a number of logical groups, equal to the number of logical groups, and so forth. As data is provided to the IR data bus 376 the state machine engines 14 receive the data and store data that is intended for that state machine engine 14. For example, because the state machine engines 14 F0 and F1 are part of the logical group 0, the state machine engines 14 F0 and F1 store every first byte provided by each of the state machine engines 14. Furthermore, because the state machine engines 14 F2 and F3 are part of the logical group 1, the state machine engines 14 F2 and F3 store every second byte provided by each of the state machine engines 14. In certain embodiments, each of the state machine engines 14 is configured to store data based on the falling edge of the IRDQS 384 and/or the IRDQS# 386.

In the illustrated embodiment, each of the state machine engines 14 provided only one data burst. However, as may be appreciated, the rotating cycle of each state machine engine 14 providing data bursts may repeat any number of times before the RSYNC 380 transitions from a logic high to a logic low at the time 390. In certain embodiments, the cycle of each state machine engine 14 providing data bursts may be repeated based on instructions provided to the state machine engines 14 from the processor 12. For example, the processor 12 may provide an instruction to each of the state machine engines 14 indicating a number of bytes that the respective state machine engine 14 is to store (CNTC) from the IR data bus 376. Accordingly, the cycle of each state machine engine 14 providing data bursts may be repeated a number of times equal to the CNTC number. In certain embodiments, the CNTC number may be equal to a length of the longest data group to be provided to a logical group, thereby enabling sufficient cycles for each logical group to receive its intended data. Moreover, the processor 12 may provide an instruction to each of the state machine engines 14 indicating a number of bytes that the respective state machine engine 14 is to analyze (CNTV). In certain embodiments, if the CNTC number is greater than the CNTV number, the state machine engine 14 may consider the bytes received after the CNTV number up to the CNTC number as invalid data (e.g., junk data, garbage data, etc.).

At a time 404, the RSYNC 380 transitions from a logic low to a logic high. Such a transition indicates that all of the state machine engines 14 F0, F1, F2, and F3 have received an instruction (e.g., from the processor 12) that initiates synchronization of the state machine engines 14, that all of the state machine engines 14 F0, F1, F2, and F3 have paused operation, and that all of the state machine engines 14 F0, F1, F2, and F3 have stopped driving the signal of the RSYNC 380 to a logic low. In this example, the state machine engines 14 F0, F1, F2, and F3 have encountered an M_BAR instruction. The M_BAR instruction is used to synchronize the state machine engines 14 before additional instructions are executed by the state machine engines 14. At a time 405, the RSYNC 380 transitions from a logic high to a logic low. Such a transition indicates that at least one of the state machine engines 14 F0, F1, F2, and F3 has pulled the RSYNC 380 to a logic low, and that the state machine engines 14 are synchronized and may proceed with executing additional instructions.

At a time 406, the RSYNC 380 transitions from a logic low to a logic high. In this example, the state machine engines 14 F0, F1, F2, and F3 have encountered another data buffer processing instruction (e.g., I_DA.PROCESS, I_DA.PROCESS_EoP, I_DA.PROCESS_EoD, I_DB.PROCESS, I_DB.PROCESS_EoP, and I_DB.PROCESS_EoD). Accordingly, at a time 407, the IRDV 382 transitions from a logic low to a logic high. Such a transition is an indication from the "master" state machine engine 14 F0 to all of the state machine engines 14 F0, F1, F2, and F3 that valid data will begin to be provided to the IR data bus 376, starting with the "master" device and continuing through each state machine engine 14 in the rank in order (e.g., F0, F1, F2, F3). At a time 408, the "master" state machine engine 14 F0 provides data (e.g., a first byte of data intended for logical group 0) onto the IR data bus 376 and outputs a logic high onto the IRDQS 384 and/or the IRDQS# 386. Then, at a time 409, the "master" state machine engine 14 F0 provides data (e.g., a second byte of data intended for logical group 1) onto the IR data bus 376 and outputs a logic high onto the IRDQS 384 and/or the IRDQS# 386. Other state machine engines 14 may thereafter provide data onto the IR data bus 376 as described above in relation to times 388 through 394.

During operation of the state machine engines 14, data may be provided to the IR data bus 376 in a synchronized manner using the RSYNC 380 and the IRDV 382 with all of the state machine engines 14 being synchronized together. Moreover, each of the state machine engines 14 stores instructions indicating its position in the rank of devices that make up the module 340. As such, each of the state machine engines 14 is able to time data storage and data output to facilitate orderly data transfer using the IR data bus 376 so that data is provided and stored at the right time. As may be appreciated, errors may occur during the data transfer process. Accordingly, the "master" state machine engine 14 F0 may transition the IRDV 382 to a logic low at any time to stop (e.g., block, stall, delay, etc.) data transfer on the IR data bus 376 until the error is resolved. Furthermore, any of the state machine engines 14 F1, F2, and F3 may direct the RSYNC 380 to a logic low, thereby providing an indication to the "master" state machine engine 14 F0 that data transfer on the IR data bus 376 should be stopped.

FIG. 18 illustrates an example of data stored in data buffers 132 of multiple physical state machine engines 14 organized into multiple logical groups. Specifically, FIG. 18 illustrates a table 410 of a DDR3 interface view for the module 340 having eight state machine engines 14 (F0, F1, F2, F3, F4, F5, F6, and F7) organized into eight logical groups. Such a configuration with eight logical groups may provide a maximum data throughput for the module 340 having eight state machine engines 14. In the illustrated embodiment, the state machine engines 14 are coupled to a DDR3 bus interface 130 having 64 data lines. Accordingly, eight data lines are coupled to each state machine engine 14. However, the same concepts described herein may be applied to any suitable DDR3 bus interface 130 with any suitable number of data lines coupled to each state machine engine 14. Furthermore, the same concepts described herein may be applied to a module 340 having any suitable number of state machine engines 14. The table 410 illustrates data that the module 340 receives from the processor 12 and stores in an offset manner among the state machine engines 14. By using the module 340 to store the data on the module 340 in an offset manner rather than using the processor 12 to rearrange the data, the processor 12 may be free to perform other functions.

The table 410 includes a write count column 412 indicating a number of writes from the processor 12 to the 64 data lines and byte number columns 414 indicating individual byte numbers in numerical order based on when the bytes are received from the processor 12. The byte number columns 414 include columns F0, F1, F2, F3, F4, F5, F6, and F7 indicating specific bytes that are stored in the data buffer system 159 of a respective state machine engine 14 (F0, F1, F2, F3, F4, F5, F6, and F7). The table 410 also includes a data buffer address column 416 indicating an address within each of the data buffers A and B 132 of the data buffer system 159 where the bytes indicated in the byte number columns 414 are stored, and a target column 418 indicating data to be processed by a specific logical group of the state machine engines 14. For example, during a first write from the processor 12 to the 64 data lines (e.g., 0 in the write count column 412), the processor 12 provides to the DDR3 address bus 342 an address selection of a first address of the data buffer system 159 (e.g., processor write address 0) and the corresponding eight data bytes. This may result in a first data byte (e.g., 0) being stored in a first state machine engine 14 (e.g., F0) at a first data buffer address 416 (e.g., 0) of the first state machine engine 14 (e.g., F0), a second data byte (e.g., 1) being stored in a second state machine engine 14 (e.g., F1) at the same first data buffer address 416 (e.g., 0) of the second state machine engine 14 (e.g., F1), a third data byte (e.g., 2) being stored in a third state machine engine 14 (e.g., F2) at the same first data buffer address 416 (e.g., 0) of the third state machine engine 14 (e.g., F2), a fourth data byte (e.g., 3) being stored in a fourth state machine engine 14 (e.g., F3) at the same first data buffer address 416 (e.g., 0) of the fourth state machine engine 14 (e.g., F3), a fifth data byte (e.g., 4) being stored in a fifth state machine engine 14 (e.g., F4) at the same first data buffer address 416 (e.g., 0) of the fifth state machine engine 14 (e.g., F4), a sixth data byte (e.g., 5) being stored in a sixth state machine engine 14 byte (e.g., F5) at the same first data buffer address 416 (e.g., 0) of the sixth state machine engine 14 (e.g., F5), a seventh data byte (e.g., 6) being stored in a seventh state machine engine 14 (e.g., F6) at the same first data buffer address 416 (e.g., 0) of the seventh state machine engine 14 (e.g., F6), and an eighth data byte (e.g., 7) being stored in an eighth state machine engine 14 (e.g., F7) at the same first data buffer address 416 (e.g., 0) of the eighth state machine engine 14 (e.g., F7).

As another example, during a second write from the processor 12 to the 64 data lines (e.g., 1 in the write count column 412), the processor 12 provides to the DDR3 address bus 342 an address selection of a second address of the data buffer system 159 (e.g., processor write address 1) and the corresponding eight data bytes. This may result in a first data byte (e.g., 8) being stored in the first state machine engine 14 (e.g., F0) at a second data buffer address 416 (e.g., 8) of the first state machine engine 14 (e.g., F0), a second data byte (e.g., 9) being stored in the second state machine engine 14 (e.g., F1) at the same second data buffer address 416 (e.g., 8) of the second state machine engine 14 F1, a third data byte (e.g., 10) being stored in the third state machine engine 14 (e.g., F2) at the same second data buffer address 416 (e.g., 8) of the third state machine engine 14 (e.g., F2), a fourth data byte (e.g., 11) being stored in the fourth state machine engine 14 (e.g., F3) at the same second data buffer address 416 (e.g., 8) of the fourth state machine engine 14 (e.g., F3), a fifth data byte (e.g., 12) being stored in the fifth state machine engine 14 (e.g., F4) at the same second data buffer address 416 (e.g., 8) of the fifth state machine engine 14 (e.g., F4), a sixth data byte (e.g., 13) being stored in the sixth state machine engine 14 (e.g., F5) at the same second data buffer address 416 (e.g., 8) of the sixth state machine engine 14 (e.g., F5), a seventh data byte (e.g., 14) being stored in the seventh state machine engine 14 (e.g., F6) at the same second data buffer address 416 (e.g., 8) of the seventh state machine engine 14 (e.g., F6), and an eighth data byte (e.g., 15) being stored in the eighth state machine engine 14 (e.g., F7) at the same second data buffer address 416 (e.g., 8) of the eighth state machine engine 14 (e.g., F7). As illustrated in the two examples, the data buffer address 416 changed by eight (e.g., a number equal to the number of logical groups in the rank of module 340) between the first write from the processor 12 to the second write from the processor 12. Although the processor 12 continues writing a lineal address block, on successive processor 12 writes to the data buffer system 159, the data buffer address 416 continues to be automatically incremented by eight, until all data intended for the first logical group (logical group 0) is provided to the module 340. Data is provided to the other logical groups in a similar manner, as illustrated.

For example, during a 513th write from the processor 12 to the 64 data lines (e.g., 512 in the write count column 412), the processor 12 provides to the DDR3 address bus 342 an address selection of a third address of the data buffer system 159 (e.g., processor write address 512) and the corresponding eight data bytes. This may result in a first data byte (e.g., 4096) being stored in the first state machine engine 14 (e.g., F0) at a third data buffer address 416 (e.g., 1) of the first state machine engine 14 (e.g., F0), a second data byte (e.g., 4097) being stored in the second state machine engine 14 (e.g., F1)

at the same third data buffer address 416 (e.g., 1) of the second state machine engine 14 (e.g., F1), a third data byte (e.g., 4098) being stored in the third state machine engine 14 (e.g., F2) at the same third data buffer address 416 (e.g., 1) of the third state machine engine 14 (e.g., F2), a fourth data byte (e.g., 4099) being stored in the fourth state machine engine 14 (e.g., F3) at the same third data buffer address 416 (e.g., 1) of the fourth state machine engine 14 (e.g., F3), a fifth data byte (e.g., 4100) being stored in the fifth state machine engine 14 (e.g., F4) at the same third data buffer address 416 (e.g., 1) of the fifth state machine engine 14 (e.g., F4), a sixth data byte (e.g., 4101) being stored in the sixth state machine engine 14 (e.g., F5) at the same third data buffer address 416 (e.g., 1) of the sixth state machine engine 14 (e.g., F5), a seventh data byte (e.g., 4102) being stored in the seventh state machine engine 14 (e.g., F6) at the same third data buffer address 416 (e.g., 1) of the seventh state machine engine 14 (e.g., F6), and an data eighth byte (e.g., 4103) being stored in the eighth state machine engine 14 (e.g., F7) at the same third data buffer address 416 (e.g., 1) of the eighth state machine engine 14 (e.g., F7).

It should be noted that the table 410 indicates that all of the writes 0 through 511 from the write count column 412 include data intended for the logical group 0 which includes the first state machine engine 14 (e.g., F0). Furthermore, the table 410 indicates that all of the writes 512 through 1023 from the write count column 412 include data intended for the logical group 1 which includes the second state machine engine 14 (e.g., F1), and so forth.

FIG. 19 illustrates an example of data stored in process buffers 134 of multiple physical state machine engines 14 organized into multiple logical groups. Specifically, FIG. 19 illustrates a table 421 of an IR data bus 376 view for the module 340 having eight state machine engines 14 (F0, F1, F2, F3, F4, F5, F6, and F7) organized into eight logical groups. The table 421 includes the byte number columns 414 indicating individual byte numbers received from the processor 12. The byte number columns 414 include columns F0, F1, F2, F3, F4, F5, F6, and F7 indicating specific bytes that are stored in the data buffer system 159 of a respective state machine engine 14 (F0, F1, F2, F3, F4, F5, F6, and F7). The table 421 also includes the data buffer address column 416 indicating an address within one of the data buffers A and B 132 of the data buffer system 159 where the bytes indicated in the byte number columns 414 are stored. Furthermore, the table 421 includes byte number columns 426 indicating individual byte numbers stored in the process buffers 134. The byte number columns 426 include columns F0, F1, F2, F3, F4, F5, F6, and F7 indicating specific bytes that are stored in the process buffers 134 of a respective state machine engine 14 (F0, F1, F2, F3, F4, F5, F6, and F7). For example, a process buffer A row 428 indicates specific bytes that are stored in a first process buffer of the state machine engine 14, and a process buffer B row 430 indicates specific bytes that are stored in a second process buffer of the state machine engine 14.

Accordingly, the table 421 illustrates that data is stored in the data buffer system 159 in an offset manner and provided to the process buffers 134 in a straight manner. For example, during a first data burst onto the IR data bus 376, the state machine engine 14 F0 may provide bytes 0, 4096, 8192, 12288, 16384, 20480, 24576, and 28672 received from the processor 12 (e.g., the first byte for each of the logical groups). During a second burst onto the IR data bus 376, the state machine engine 14 F1 may provide bytes 1, 4097, 8193, 12289, 16385, 20481, 24577, and 28673 received from the processor 12 (e.g., the second byte for each of the logical groups), and so forth. Each of the state machine engines 14 are configured to store bytes from the data burst that correspond to that state machine engine's logical group. For example, the state machine engine 14 F0 is configured to store the first byte of each data burst provided to the IR data bus 376, the state machine engine 14 F1 is configured to store the second byte of each data burst provided to the IR data bus 376, and so forth. Thus, the data that was stored in an offset manner when stored by the data buffer system 159 is provided to the state machine engines 14 over the IR data bus 376 so that each state machine engine 14 may receive its intended data in a correct order for analysis.

FIG. 20 illustrates an example of data stored in data buffers 132 of multiple physical state machine engines 14 organized into one logical group. Specifically, FIG. 20 illustrates a table 432 of a DDR3 interface view for the module 340 having eight state machine engines 14 (F0, F1, F2, F3, F4, F5, F6, and F7) organized into one logical group. As illustrated, data is provided by the processor 12 and stored in the state machine engines 14 (F0, F1, F2, F3, F4, F5, F6, and F7). All of the state machine engines 14 are part of a single logical group (e.g., logical group 0). In the illustrated embodiment, data received by the module 340 is stored consecutively in the data buffer system 159.

FIG. 21 illustrates an example of data stored in process buffers 134 of multiple physical state machine engines 14 organized into one logical group. Specifically, FIG. 21 illustrates a table 434 of an IR data bus 376 view for the module 340 having eight state machine engines 14 (F0, F1, F2, F3, F4, F5, F6, and F7) organized into one logical group. During a first data burst onto the IR data bus 376, the state machine engine 14 F0 may provide byte 0 received from the processor 12 (e.g., the first byte for the logical group), the state machine engine 14 F1 may provide byte 1 received from the processor 12 (e.g., the second byte for the logical group), and so forth, so that eight bytes are provided during the data burst. Each of the state machine engines 14 are configured to store bytes from the data burst that correspond to that state machine engine's logical group. For example, all of the state machine engines 14 F0, F1, F2, F3, F4, F5, F6, and F7 are configured to store all bytes of each data burst provided to the IR data bus 376. Thus, all of the data stored by the data buffer system 159 is provided to the state machine engines 14 over the IR data bus 376 so that each state machine engine 14 may receive all of the data for parallel analysis. As may be appreciated, while FIGS. 18-21 illustrate buffers having 4 KBytes, other embodiments may include buffers having any suitable size (e.g., 8 KBytes, 16 KBytes, 32 KBytes, 64 KBytes, etc.).

As used herein, the term apparatus may be a single module, or a system including one or more modules. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. An apparatus, comprising:
a first state machine engine configured to receive a first portion of a data stream;
a second state machine engine different than the first state machine engine and configured to receive a second portion of the data stream, wherein the second portion of the data stream is different than the first portion of the data stream; and a buffer interface configured to enable data transfer between the first state machine engine and the second state machine engine, the buffer interface comprising an interface data bus coupled to the first state machine engine and to the second state machine engine, and configured to provide data between the first state machine engine and the second state machine engine.

2. The apparatus of claim 1, wherein the interface data bus is a bi-directional bus.

3. The apparatus of claim 1, wherein the interface data bus comprises an 8 bit inter-rank data bus.

4. The apparatus of claim 1, wherein the buffer interface further comprises an instruction bus coupled to the first state machine engine and to the second state machine engine, and configured to coordinate data transfer between the first state machine engine and the second state machine engine.

5. The apparatus of claim 4, wherein the first state machine engine is a master device configured to provide instructions to the instruction bus to coordinate data transfer between the first state machine engine and the second state machine engine.

6. The apparatus of claim 4, wherein the second state machine engine is a slave device configured to receive instructions provided to the instruction bus by a master device, wherein the instructions are configured to control a time that the second state machine engine provides the second portion of the data stream to the interface data bus.

7. The apparatus of claim 1, wherein at least one of the first state machine engine and the second state machine engine comprises an output configured to enable data to be provided on the interface data bus, to stop data from being provided to the interface data bus, or some combination thereof.

8. The apparatus of claim 1, wherein at least one of the first state machine engine and the second state machine engine comprises an output configured to synchronize data provided to the interface data bus.

9. The apparatus of claim 1, wherein the first and second state machine engines are part of a logical group, and the first state machine engine is configured to analyze a same portion of the data stream as the second state machine engine.

10. The apparatus of claim 1, wherein the first state machine engine is part of a first logical group, the second state machine engine is part of a second logical group, and the first and second logical groups are configured to analyze different portions of the data stream.

11. The apparatus of claim 1, wherein the first state machine engine is part of a first logical group, the second state machine engine is part of a second logical group, and at least one of the first logical group and the second logical group comprises a plurality of state machine engines.

12. The apparatus of claim 11, wherein the first logical group comprises a greater number of state machine engines than the second logical group.

13. The apparatus of claim 1, wherein the first state machine engine comprises a first bus position, the first state machine engine comprises a first storage configured to store data corresponding to the first bus position, the second state machine engine comprises a second bus position, and the second state machine engine comprises a second storage configured to store data corresponding to the second bus position.

14. The apparatus of claim 1, wherein the first state machine engine is configured to store data corresponding to a bus width of the interface data bus.

15. The apparatus of claim 1, wherein the first state machine engine is configured to store a first data set provided to the interface data bus after a synchronizing signal is received by the first and second state machine engines, and the second state machine engine is configured to store a second data set provided to the interface data bus after the synchronizing signal is received by the first and second state machine engines.

16. The apparatus of claim 15, wherein each of the first and second data sets comprise one byte.

17. The apparatus of claim 1, wherein each of the first and second state machine engines are part of a rank of state machine engines.

18. The apparatus of claim 17, wherein each state machine engine of the rank of state machine engines is configured to sequentially provide a respective byte to the buffer interface.

19. The apparatus of claim 18, wherein each state machine engine of the rank of state machine engines is configured to receive all of the respective bytes provided to the buffer interface.

20. The apparatus of claim 18, wherein each state machine engine of the rank of state machine engines is configured to receive a portion of the respective bytes provided to the buffer interface.

21. A method for operating a buffer interface, comprising:
receiving, at a master chip, a first portion of a data stream;
receiving, at a slave chip, a second portion of the data stream, wherein the first portion of the data stream is different than the second portion of the data stream;
providing a first signal from the master chip to the slave chip using the buffer interface to initiate data transfer between the master chip and the slave chip;
providing the first portion of the data stream to the buffer interface at a first time after providing the first signal from the master chip; and
providing the second portion of the data stream to the buffer interface at a second time after the first time.

22. The method of claim 21, comprising providing a second signal from the master chip to the slave chip using the buffer interface to stop data transfer between the master chip and the slave chip.

23. The method of claim 21, comprising providing a second signal from the slave chip to the master chip using the buffer interface to stop data transfer between the master chip and the slave chip.

24. The method of claim 21, comprising providing an instruction to at least one of the master chip and the slave chip to analyze data for a period of time.

25. The method of claim 21, comprising providing an instruction to the master chip and to the slave chip to instruct the master chip and the slave chip to synchronize before an instruction is executed.

26. The method of claim 25, wherein the instruction comprises a data buffer processing instruction.

27. A method for storing data, comprising:
receiving a first address from a processor;
receiving, at a first state machine engine, a first portion of a first data block from the processor;
receiving, at a second state machine engine different than the first state machine engine, a second portion of the first data block from the processor, wherein the second portion of the first data block is received at the second state machine engine in parallel with the first state machine engine receiving the first portion of the first data block, and wherein the second portion of the first data block is different than the first portion of the first data block;

storing the first portion of the first data block at a first memory location of the first state machine engine corresponding to the first address;

storing the second portion of the first data block at a second memory location of the second state machine engine corresponding to the first address;

receiving a second address from the processor;

receiving, at the first state machine engine, a third portion of the first data block from the processor, wherein the third portion of the first data block is different than each of the second portion of the first data block and the first portion of the first data block;

receiving, at the second state machine engine, a fourth portion of the first data block from the processor, wherein the fourth portion of the first data block is received at the second state machine engine in parallel with the first state machine engine receiving the third portion of the first data block, and wherein the fourth portion of the first data block is different than each of the third portion of the first data block, the second portion of the first data block and the first portion of the first data block;

storing the third portion of the first data block at a third memory location of the first state machine engine corresponding to the second address; and storing the fourth portion of the first data block at a fourth memory location of the second state machine engine corresponding to the second address;

wherein the first state machine engine receives the third portion of the first data block directly after receiving the first portion of the first data block, the second state machine engine receives the fourth portion of the first data block directly after receiving the second portion of the first data block, the third memory location is offset from the first memory location by a predetermined offset, and the fourth memory location is offset from the second memory location by the predetermined offset.

28. The method of claim 27, comprising analyzing the first data block with a lattice of the first state machine engine.

29. The method of claim 27, comprising:
providing the first portion of the first data block and the third portion of the first data block from the first state machine engine to a buffer interface;
providing the second portion of the first data block and the fourth portion of the first data block from the second state machine engine to the buffer interface; and
receiving, at the first state machine engine, the first, second, third, and fourth portions of the first data block from the buffer interface.

30. The method of claim 29, comprising storing, by the first state machine engine, data received from the buffer interface based at least partly on a timing of data received from the buffer interface.

31. The method of claim 29, comprising receiving, at the first state machine engine, the first, second, third, and fourth portions of the first data block in the same order the first, second, third, and fourth portions of the first data block are provided from the processor.

32. The method of claim 27, comprising:
receiving a third address from the processor;
receiving, at the first state machine engine, a first portion of a second data block from the processor;
receiving, at the second state machine engine, a second portion of the second data block from the processor, wherein the second portion of the second data block is received at the second state machine engine in parallel with the first state machine engine receiving the first portion of the second data block;
storing the first portion of the second data block at a fifth memory location of the first state machine engine corresponding to the third address;
storing the second portion of the second data block at a sixth memory location of the second state machine engine corresponding to the third address;
receiving a fourth address from the processor;
receiving, at the first state machine engine, a third portion of the second data block from the processor;
receiving, at the second state machine engine, a fourth portion of the second data block from the processor, wherein the fourth portion of the second data block is received at the second state machine engine in parallel with the first state machine engine receiving the third portion of the second data block;
storing the third portion of the second data block at a seventh memory location of the first state machine engine corresponding to the fourth address; and
storing the fourth portion of the second data block at an eighth memory location of the second state machine engine corresponding to the fourth address;
wherein the first state machine engine receives the third portion of the second data block directly after receiving the first portion of the second data block, the second state machine engine receives the fourth portion of the second data block directly after receiving the second portion of the second data block, the fifth memory location is offset from the first memory location by one, the seventh memory location is offset from the fifth memory location by the predetermined offset, the sixth memory location is offset from the second memory location by one, and the eighth memory location is offset from the sixth memory location by the predetermined offset.

33. The method of claim 32, comprising analyzing the second data block with a lattice of the second state machine engine.

34. A method for processing data, comprising:
receiving, at a plurality of state machine engines, a first data block from a processor to be analyzed by a first state machine engine of the plurality of state machine engines; and
receiving, at the plurality of state machine engines, a second data block from the processor to be analyzed by a second state machine engine of the plurality of state machine engines, wherein the second state machine engine is different than the first state machine engine, and wherein the second data block is different than the first data block;
wherein a length of valid data in the first data block is different from a length of valid data in the second data block.

35. The method of claim 34, comprising:
receiving, at the first state machine engine, a first instruction from the processor corresponding to the first data block; and
receiving, at the second state machine engine, a second instruction from the processor corresponding to the second data block.

36. The method of claim 35, wherein receiving the first data block from the processor comprises receiving a first portion of the first data block at the first state machine engine and receiving a second portion of the first data block at the second state machine engine.

37. The method of claim 36, wherein receiving the second data block from the processor comprises receiving a first portion of the second data block at the first state machine engine and receiving a second portion of the second data block at the second state machine engine.

38. The method of claim 37, comprising providing the first portion of the first data block and the second portion of the first data block to a buffer interface, and providing the first portion of the second data block and the second portion of the second data block to the buffer interface.

39. The method of claim 38, wherein the first instruction includes a total number of bytes of data for the first data block.

40. The method of claim 39, wherein the first instruction includes a number of valid bytes for the first data block.

* * * * *